(12) United States Patent
Cohen et al.

(10) Patent No.: US 8,949,337 B2
(45) Date of Patent: Feb. 3, 2015

(54) GENERATION AND ESTABLISHMENT OF IDENTIFIERS FOR COMMUNICATION

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US); John D. Rinaldo, Jr., Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1267 days.

(21) Appl. No.: 11/525,198

(22) Filed: Sep. 20, 2006

(65) Prior Publication Data

US 2008/0005229 A1 Jan. 3, 2008

Related U.S. Application Data

(63) Continuation-in-part of application No. 11/480,773, filed on Jun. 30, 2006, and a continuation-in-part of application No. 11/506,415, filed on Aug. 18, 2006.

(51) Int. Cl.
*G06F 15/16* (2006.01)
*G06Q 10/00* (2012.01)
*H04L 29/06* (2006.01)
*H04L 29/08* (2006.01)

(52) U.S. Cl.
CPC ............ *G06Q 10/00* (2013.01); *H04L 63/0421* (2013.01); *H04L 67/20* (2013.01); *H04L 63/10* (2013.01)

USPC .......................................... 709/206; 709/203

(58) Field of Classification Search
CPC ............................ H04L 63/0421; H04L 67/20
USPC .......................................................... 709/206
See application file for complete search history.

(56) References Cited

U.S. PATENT DOCUMENTS

| 5,473,367 A | 12/1995 | Bales et al. |
| 6,018,668 A | 1/2000 | Schmidt |
| 6,064,671 A | 5/2000 | Killian |
| 6,185,184 B1 * | 2/2001 | Mattaway et al. ............ 370/230 |
| 6,192,396 B1 | 2/2001 | Kohler |

(Continued)

FOREIGN PATENT DOCUMENTS

EP 1 523 166 A1 4/2005

OTHER PUBLICATIONS

Abramson, Andy; "VoIP Watch: Skype Goes With Warner Music for Ringtones and Maybe More"; AndyAbramson.blogs.com; bearing a date of Jan. 30, 2006; pp. 1-6; located at: http://andyabramson.blogs.com/voipwatch/2006/01/skype_goes_with.html; printed on Jun. 26, 2006.

(Continued)

*Primary Examiner* — Richard G Keehn

(57) ABSTRACT

In one aspect, a method related to communication includes but is not limited to generating a first identifier associated with a first entity in conjunction with a communication scenario; and establishing a second identifier associated with a second entity in conjunction with the communication scenario. In addition, other method, system, and program product aspects are described in the claims, drawings, and/or text forming a part of the present disclosure.

54 Claims, 9 Drawing Sheets

(56) References Cited

U.S. PATENT DOCUMENTS

| | | | |
|---|---|---|---|
| 6,240,414 B1 | 5/2001 | Beizer et al. | |
| 6,310,946 B1 | 10/2001 | Bauer et al. | |
| 6,335,963 B1 | 1/2002 | Bosco | |
| 6,356,936 B1* | 3/2002 | Donoho et al. | 709/206 |
| 6,658,568 B1 | 12/2003 | Ginter et al. | |
| 6,678,719 B1 | 1/2004 | Stimmel | |
| 6,731,308 B1 | 5/2004 | Tang et al. | |
| 6,896,263 B2* | 5/2005 | Matthews | 273/249 |
| 6,912,564 B1 | 6/2005 | Appelman et al. | |
| 6,996,217 B2 | 2/2006 | Goldman | |
| 6,999,962 B2 | 2/2006 | Julliard et al. | |
| 7,039,597 B1 | 5/2006 | Notani et al. | |
| 7,143,175 B2 | 11/2006 | Adams et al. | |
| 7,149,296 B2 | 12/2006 | Brown et al. | |
| 7,299,257 B2 | 11/2007 | Boyer et al. | |
| 7,305,398 B2* | 12/2007 | Teicher | 1/1 |
| 7,383,307 B2 | 6/2008 | Kirkland et al. | |
| 7,533,146 B1 | 5/2009 | Kumar | |
| 7,574,746 B2 | 8/2009 | Hill et al. | |
| 7,653,188 B2 | 1/2010 | Kloberdans et al. | |
| 7,707,262 B1 | 4/2010 | Bill | |
| 7,797,732 B2 | 9/2010 | Tam et al. | |
| 7,873,996 B1 | 1/2011 | Emigh et al. | |
| 7,925,702 B2 | 4/2011 | Rood et al. | |
| 7,933,985 B2 | 4/2011 | Kurapati et al. | |
| 7,945,034 B2 | 5/2011 | Gonen et al. | |
| 8,015,414 B2 | 9/2011 | Mahone et al. | |
| 8,040,875 B2 | 10/2011 | Barclay et al. | |
| 2002/0034164 A1 | 3/2002 | Sjoholm et al. | |
| 2002/0044067 A1 | 4/2002 | Ilcisin | |
| 2002/0049751 A1 | 4/2002 | Chen et al. | |
| 2002/0076015 A1 | 6/2002 | Norwitz et al. | |
| 2002/0098879 A1* | 7/2002 | Rheey | 463/1 |
| 2002/0183100 A1 | 12/2002 | Parker | |
| 2003/0112949 A1 | 6/2003 | Brown et al. | |
| 2003/0147519 A1 | 8/2003 | Jain et al. | |
| 2003/0182371 A1 | 9/2003 | Worthen | |
| 2003/0236847 A1 | 12/2003 | Benowitz et al. | |
| 2004/0005904 A1 | 1/2004 | Wolf et al. | |
| 2004/0019641 A1 | 1/2004 | Bartram et al. | |
| 2004/0039829 A1 | 2/2004 | Bucher | |
| 2004/0088286 A1 | 5/2004 | Hackleman et al. | |
| 2004/0103147 A1 | 5/2004 | Flesher et al. | |
| 2004/0117194 A9 | 6/2004 | Lee et al. | |
| 2004/0254809 A1* | 12/2004 | Teicher | 705/1 |
| 2005/0086256 A1 | 4/2005 | Owens et al. | |
| 2005/0089023 A1 | 4/2005 | Barkley et al. | |
| 2005/0097169 A1 | 5/2005 | Mukherjee et al. | |
| 2005/0108207 A1 | 5/2005 | Thuerk | |
| 2005/0149620 A1 | 7/2005 | Kirkland et al. | |
| 2005/0160167 A1 | 7/2005 | Cheng et al. | |
| 2005/0164720 A1 | 7/2005 | Huang | |
| 2005/0181803 A1* | 8/2005 | Weaver et al. | 455/456.1 |
| 2005/0275715 A1 | 12/2005 | Shingu et al. | |
| 2006/0004869 A1* | 1/2006 | Yuster et al. | 707/104.1 |
| 2006/0019689 A1 | 1/2006 | Pantalone et al. | |
| 2006/0067502 A1 | 3/2006 | Bamrah et al. | |
| 2006/0140200 A1* | 6/2006 | Black et al. | 370/401 |
| 2006/0222155 A1 | 10/2006 | Summers et al. | |
| 2006/0227754 A1 | 10/2006 | Ko | |
| 2006/0242303 A1 | 10/2006 | Petrack | |
| 2006/0246934 A1 | 11/2006 | Patel et al. | |
| 2007/0021200 A1* | 1/2007 | Fox et al. | 463/30 |
| 2007/0036310 A1* | 2/2007 | Smith et al. | 379/114.15 |
| 2007/0042763 A1 | 2/2007 | Yeh | |
| 2007/0081648 A1 | 4/2007 | Abramson et al. | |
| 2007/0121596 A1 | 5/2007 | Kurapati et al. | |
| 2007/0121614 A1 | 5/2007 | Sandell et al. | |
| 2007/0133774 A1 | 6/2007 | Fujimoto | |
| 2007/0156811 A1 | 7/2007 | Jain et al. | |
| 2007/0172047 A1 | 7/2007 | Coughlan et al. | |
| 2007/0204033 A1 | 8/2007 | Bookbinder et al. | |
| 2007/0232285 A1 | 10/2007 | Lush et al. | |
| 2007/0240081 A1 | 10/2007 | Grossman et al. | |
| 2007/0244807 A1 | 10/2007 | Andringa et al. | |
| 2007/0263819 A1 | 11/2007 | Finkelman et al. | |
| 2007/0263824 A1 | 11/2007 | Bangalore et al. | |
| 2007/0264974 A1 | 11/2007 | Frank et al. | |
| 2007/0288755 A1 | 12/2007 | Bryant | |
| 2008/0005229 A1 | 1/2008 | Cohen et al. | |
| 2008/0005236 A1 | 1/2008 | Schmieder | |
| 2008/0005242 A1 | 1/2008 | Cohen et al. | |
| 2008/0005681 A1 | 1/2008 | Cohen et al. | |
| 2008/0089265 A1 | 4/2008 | Benco et al. | |
| 2008/0109860 A1* | 5/2008 | Glashow et al. | 725/87 |
| 2008/0307306 A1 | 12/2008 | Pettinati et al. | |
| 2009/0209241 A1 | 8/2009 | Karaoguz et al. | |
| 2009/0316876 A1 | 12/2009 | Walsh et al. | |
| 2010/0322395 A1 | 12/2010 | Michaelis et al. | |
| 2011/0004939 A1 | 1/2011 | Cohen et al. | |
| 2011/0004940 A1 | 1/2011 | Cohen et al. | |
| 2011/0145570 A1* | 6/2011 | Gressel et al. | 713/159 |

OTHER PUBLICATIONS

"Warner Music Group Announces Landmark Ringtone Agreement With Skype, Global Internet Calling Company: Madonna Set to Be First Exclusive 'Featured Artist' on New Online Retail Store"; Market Wire News; bearing a date of Jan. 30, 2006; pp. 1-3; New York; located at: http://www.marketwire.com/mw/release_printer_friendly?release_id=107824&category=; printed on Jun. 26, 2006.

* cited by examiner

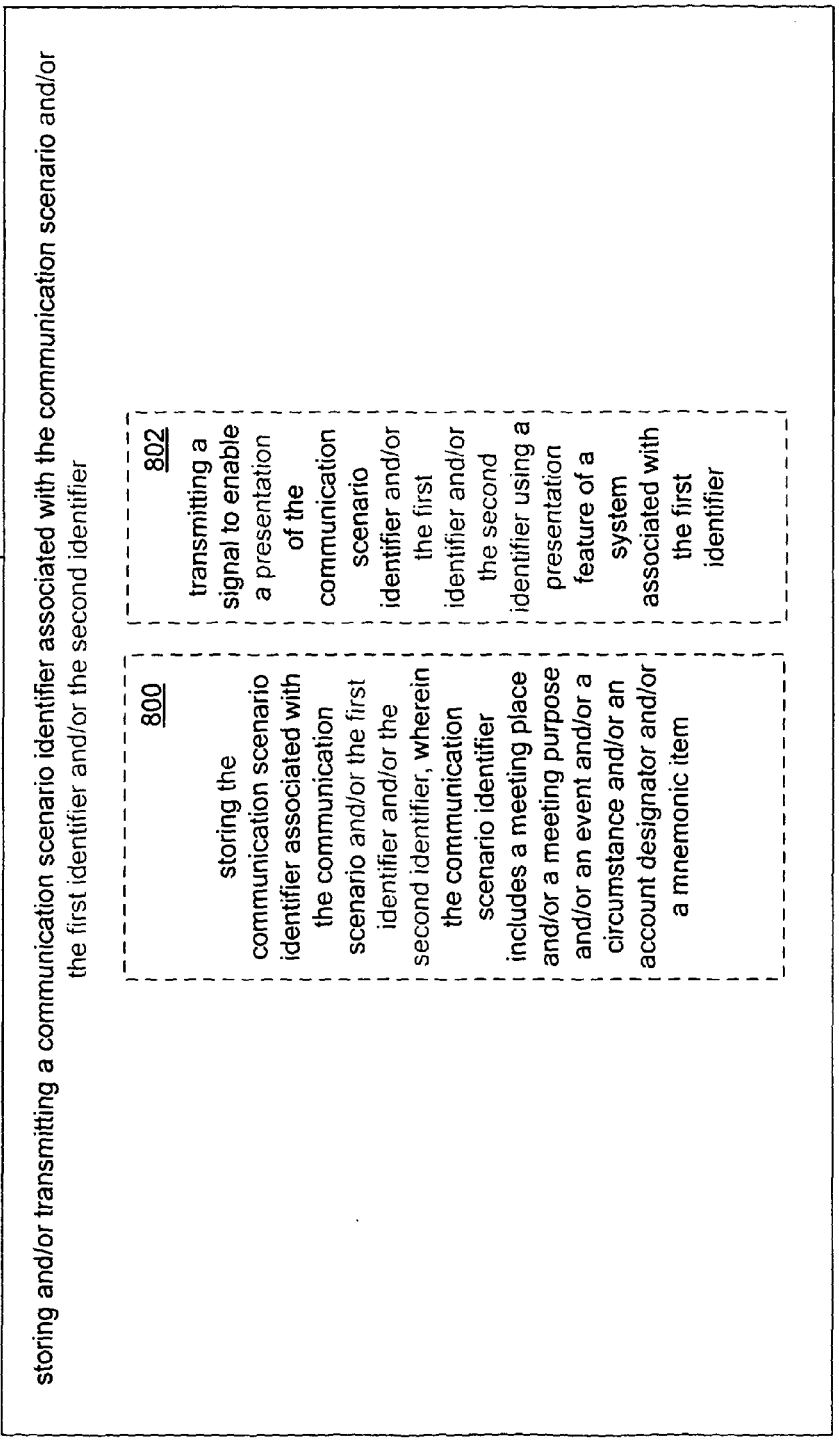

GENERATION AND ESTABLISHMENT OF IDENTIFIERS FOR COMMUNICATION

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/480,773, entitled Usage Parameters for Communication Content, naming Alexander J. Cohen, Edward K. Y. Jung, Royce A. Levien, Robert W. Lord, Mark A. Malamud, William Henry Mangione-Smith, John D. Rinaldo, Jr., and Clarence T. Tegreene, as inventors, filed 30 Jun. 2006, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/506,415, entitled Context Parameters and Identifiers for Communication, naming Alexander J. Cohen, Edward K. Y. Jung, Royce A. Levien, Robert W. Lord, Mark A Malamud, William Henry Mangione-Smith John D. Rinaldo, Jr., and Clarence T. Tegreene, as inventors, filed Aug. 18, 2006, which is currently co-pending, or is an application of which a currently co-pending application is entitled to the benefit of the filing date.

The United States Patent Office (USPTO) has published a notice to the effect that the USPTO's computer programs require that patent applicants both reference a serial number and indicate whether an application is a continuation or continuation-in-part. Stephen G. Kunin, *Benefit of Prior-Filed Application*, USPTO Official Gazette Mar. 18, 2003, available on the website of the USPTO at www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present disclosure relates, in general, to communication.

SUMMARY

In one aspect, a method related to communication includes but is not limited to generating a first identifier associated with a first entity in conjunction with a communication scenario; and establishing a second identifier associated with a second entity in conjunction with the communication scenario. In addition to the foregoing, other method aspects are described in the claims, drawings, and text forming a part of the present disclosure.

In one aspect, a system related to communication includes but is not limited to circuitry for generating a first identifier associated with a first entity in conjunction with a communication scenario; and circuitry for establishing a second identifier associated with a second entity in conjunction with the communication scenario. In addition to the foregoing, other system aspects are described in the claims, drawings, and text forming a part of the present disclosure.

In one or more various aspects, related systems include but are not limited to circuitry and/or tangible computer components capable of being functionally interconnected to a computer program and/or electro-mechanical devices and/or optical devices for effecting the herein-referenced method aspects; the circuitry and/or tangible computer components capable of being functionally interconnected to a computer program and/or electro-mechanical devices and/or optical devices can be virtually any combination of hardware, tangible computer components capable of being functionally interconnected to a computer program configured to effect the herein-referenced method aspects depending upon the design choices of the system designer skilled in the art.

In one aspect, a program product includes but is not limited to a signal bearing medium bearing one or more instructions for generating a first identifier associated with a first entity in conjunction with a communication scenario; and one or more instructions for establishing a second identifier associated with a second entity in conjunction with the communication scenario. In addition to the foregoing, other program product aspects are described in the claims, drawings, and text forming a part of the present disclosure.

In addition to the foregoing, various other method, system, and/or program product aspects are set forth and described in the teachings such as the text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 8 depicts several alternative implementations of the high-level logic flowchart of FIG. 7.

The use of the same symbols in different drawings typically indicates similar or identical items.

DETAILED DESCRIPTION

Figure 1:
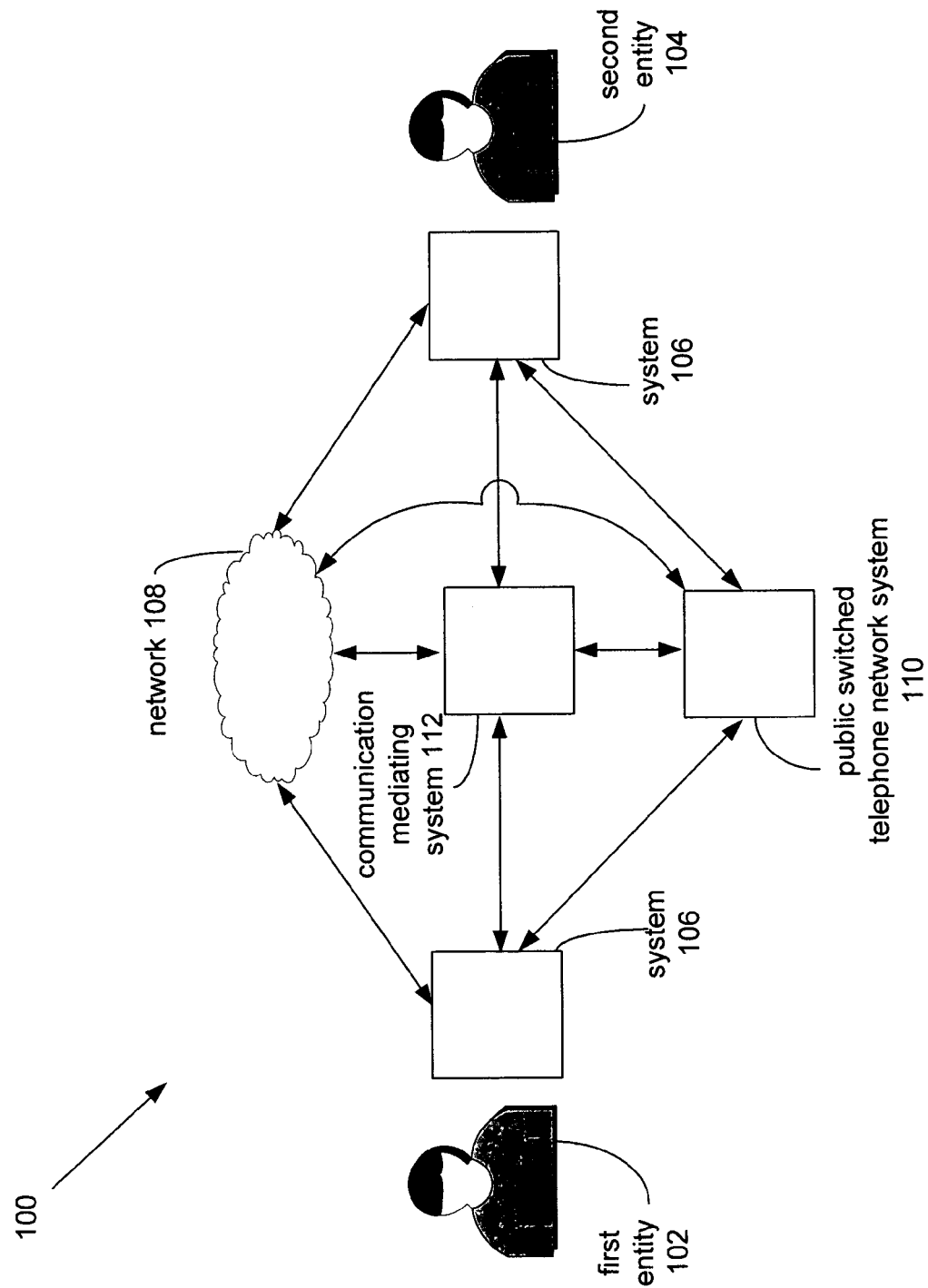
FIG. 1 depicts an exemplary environment in which the methods and systems described herein may be represented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 depicts an exemplary environment in which the methods and systems described herein may be represented.

In the exemplary environment 100, the first entity 102 may be a person and/or an entity capable of communicating with other persons and/or entities. The first entity 102 may include but is not limited to a single person, a group of two or more persons associated for the purpose of a communication (e.g., a group of three persons communicating with another person and/or group of persons to arrange a social gathering), and/or one or more persons of a group of persons associated for one or more purposes or reasons (e.g., an employee or employees of a corporation, or members of a family) some or all of whom may participate in a communication on behalf of the association.

In the exemplary environment 100, the second entity 104 may be a person and/or an entity capable of communicating with other persons and/or entities. The second entity 104 may include but is not limited to a single person, a group of two or more persons associated for the purpose of a communication (e.g., a group of three persons communicating with another person and/or group of persons to arrange a social gathering), and/or one or more persons of a group of persons associated for one or more purposes or reasons (e.g., an employee or employees of a corporation, or members of a family) some or all of whom may participate in a communication on behalf of the association.

One or more communications or other events may take place between the first entity 102 and the second entity 104. Such communications may take place using means including but not limited to telephony (using the public switched telephone network ("PSTN"), the internet via, e.g., Voice over Internet Protocol ("VoIP"), or both), instant and/or text messaging, and/or electronic mail ("email"). Systems 106 represent any systems including one or more communications devices, including but not limited to a telephone, a VoIP endpoint, a computer running email and/or instant messaging software, and/or a personal digital assistant and/or a cell phone running text messaging software. The systems 106 are illustrated in the exemplary environment 100 in close physical proximity to the first entity 102 and the second entity 104. Those skilled in the art will appreciate that one or more of the devices included in the system 106 may be relatively distant from each other or from the first entity 102 or the second entity 104 but operably coupled to one or more devices included in the systems 106 and in physical proximity to the respective entities (the first entity 102 and the second entity 104) with which the systems 106 are associated. The systems 106 may be operably coupled via some network or combination of networks (e.g., the internet, a wireless network, an intranet, etc.), represented in the exemplary environment 100 by the network 108, or by PSTN devices represented by the PSTN system 110, and/or by some combination of the network 108 and the PSTN system 110. The operable couplings between the systems 106 may be tangible connections (e.g., wires and/or cables and/or fiber optic lines), or intangible connections (e.g., wireless connections, e.g., radio-frequency connections between cell phone and cell network towers), and/or some combination of tangible and intangible connections.

Communications between the first entity 102 and the second entity 104 may be mediated wholly or in part by a communication mediating system 112. The communication mediating system 112 may be operably coupled to the network 108 and/or the PSTN system 110 and/or to the systems 106. The communication mediating system may be administered by or for a provider of telephony services, including but not limited to VoIP services, such as AT&T®, Vonage®, or Skype®. The communication mediating system 112 may include computers and/or telephony equipment, e.g., computers for providing VoIP services, that are capable of tasks including but not limited to routing telephony communications, and/or relaying telephony communications, and/or storing information associated with telephony communications, and/or transmitting information associated with telephony communications, and/or transmitting signals giving rise to presenting information associated with telephony communications. Such telephony communications and information associated with telephony communications may include but not be limited to first identifiers and/or second identifiers and/or communication scenario identifiers as described herein.

In communications with the second entity 104, the first entity 102 may wish to be identified by one or more first identifiers associated with the relevant communication scenario and associated with (a) a location, such as an actual location of the first entity 102 during a communication with the second entity 104 or a location (fictional or real) at which the first entity 102 is not located during a communication with the second entity 104 (e.g., for purposes of communications security during a confidential activity in which the first entity 102 is involved, and/or for purposes of deception of the second entity 104 and/or of persons and/or entities proximate to or associated with the second entity 104); (b) a system (fictional or real) that is associated with the first entity 102 or that the first entity 102 wishes the second entity 104 and/or persons proximate to or associated with the second entity 104 to believe is associated with the first entity 102, e.g., a system represented by a secondary telephone number generated for the purpose of giving to the second entity 104 and associated with a primary telephone number for a system 106 associated with the first entity 102 such that, when the generated number is called, the call will be directed to the system 106 associated with the first entity 102 (e.g., for purposes of communications security during a confidential activity in which the first entity 102 is involved, or for purposes of deception); or (c) an identity (fictional or real) that is associated with the first entity 102 or that the first entity 102 wishes the second entity 104 and/or persons proximate to or associated with the second entity 104 to believe is associated with the first entity 102 (e.g., for purposes of communications security during a confidential activity in which the first entity 102 is involved, or for purposes of deception), e.g., a name and/or nickname and/or code name of the first entity 102, a telephone number nominally associated with the first entity 102, an IP address associated with a system nominally associated with the first entity 102, and/or an electronic mail address nominally associated with the first entity 102.

A first identifier may be fictional or real. A first identifier may be created from and/or generated by one or more of a number of sources or methods, including but not limited to random and/or pseudo-random generation and/or selection from a database. Within the communication scenario, the first entity 102 may wish communications with the second entity 104 to be identified by one or more of the first identifiers, e.g., to have one or more of the first identifiers presented using a caller identification feature associated with a system associated with the first entity 102. Presentation of one or more selected real first identifiers or one or more fictional first identifiers may be desirable in a given communication scenario, e.g., for purposes of communications security and/or deception of persons proximate to or associated with the first entity 102. For example, if a communication within a given communication scenario is a telephone call from the first entity 102 to the second entity 104, a real or fictional first identifier including a false telephone number and/or a false name may give rise to a presentation feature via a user interface of a system 106 associated with the first entity 102, e.g., a visual presentation, an audio presentation, and/or a tactile presentation respectively presented through a visual presentation device, an audio presentation device, and/or a tactile presentation device of the user interface of the system 106, for, e.g., verification of the first identifier, via text/graphics, an audio announcement, and/or a specific vibration pattern respectively presented through a display, a speaker, and/or a vibration device of the user interface of the system 106 associated with the first entity 102, e.g., for purposes of communications security and/or deception of persons proximate to or associated with the first entity 102.

A first identifier may be stored using the memory resources and/or hardware and/or software and/or firmware ("hardware/software/firmware") of the system associated with the first entity 102 and/or memory resources and/or hardware/software/firmware operably coupled to the system 106 associated with the first entity 102.

In communications with the second entity 104, the first entity 102 may wish to identify the second entity 104 by one or more second identifiers associated with the relevant communication scenario and associated with (a) a location, such as an actual location of the first entity 102 during a communication with the second entity 104 or a location (fictional or real) at which the first entity 102 is not located during a communication with the second entity 104 (e.g., for purposes of communications security during a confidential activity in which the first entity 102 is involved, and/or for purposes of deception of the second entity 104 and/or of persons and/or entities proximate to or associated with the second entity 104); (b) a system (fictional or real) that is associated with the second entity 104 or that the first entity 102 wishes persons proximate to or associated with the first entity 102 to believe is associated with the second entity 104, e.g., a system represented by a secondary telephone number generated for the purpose of communications within the relevant communication scenario and associated with a primary telephone number for a system 106 associated with the second entity 104 (e.g., for purposes of communications security during a confidential activity in which the first entity 102 is involved, or for purposes of deception); or (c) an identity (fictional or real) that is associated with the second entity 104 or that the first entity 102 wishes persons proximate to or associated with the first entity 102 to believe is associated with the second entity 104 (e.g., for purposes of communications security during a confidential activity in which the first entity 102 is involved, or for purposes of deception), e.g., a name and/or nickname and/or code name and/or a role (e.g., salesman, engineer) of the second entity 104, a telephone number nominally associated with the second entity 104, an IP address associated with a system nominally associated with the second entity 104, and/or an electronic mail address nominally associated with the second entity 104.

A second identifier may be created and/or selected and/or generated and/or established from one or more of a number of sources or methods, including but not limited to random and/or pseudo-random generation and/or selection from a database and/or from user input.

Presentation of one or more second identifiers may be desirable in a given communication scenario, e.g., for purposes of communications security and/or deception of persons proximate to or associated with the first entity 102. For example, if a communication within a given communication scenario is a VoIP call from the second entity 104 to the first entity 102, a second identifier may give rise to a presentation feature via a user interface of a system 106 associated with the first entity 102, e.g., a visual presentation, an audio presentation, and/or a tactile presentation respectively presented through a visual presentation device, an audio presentation device, and/or a tactile presentation device of the user interface of the system 106, for, e.g., verification of the second identifier, via text/graphics, an audio announcement, and/or a specific vibration pattern respectively presented through a display, a speaker, and/or a vibration device of the user interface of the system 106 associated with the first entity 102, e.g., for purposes of communications security and/or deception of persons proximate to or associated with the first entity 102.

A second identifier may be stored using the memory resources and/or hardware/software/firmware of the system 106 associated with the first entity 102 and/or memory resources and/or hardware/software/firmware operably coupled to the system 106 associated with the first entity 102.

A communication scenario may include an intended continuing relationship including communication, e.g., a continuing social and/or a business and/or an investigative relationship, such as a continuing relationship including communication between a single male and a single female he met at a party, a continuing relationship including communication between an investigator and an investigation target, a continuing relationship including communication such as an intelligence collection effort conducted by a first entity 102 using a second entity 104, and/or a continuing relationship including communication such as a secret business negotiation between a businessperson and a negotiation interlocutor. A communication scenario identifier may be associated with a relevant communication scenario. A communication scenario identifier may include but not be limited to an identifier such as a name and/or tag and/or number and/or alphanumeric label for a location associated with the second entity 104, a system associated with the second entity 104, and/or an identity of the second entity 104, and/or a feature of the context in which the first entity 102 associates, has associated, will associate, and/or anticipates associating with the second entity 104 (e.g., a partial description of the second entity 104, a partial description of a location of a meeting with the second entity 104, and/or a mnemonic item associated with the second entity 104). For example, a communication scenario identifier may include but not be limited to an identifier associated with (a) a location, such as the location at which the first entity 102 met the second entity 104 and/or the location of the second entity 104 when the first entity 102 and the second entity 104 first communicated, e.g., a business meeting or a social gathering, and/or one or more likely locations of the second entity 104 when further communications take place; (b) a system associated with a second entity 104 which the second entity 104 may use in communications with the first entity 102, e.g., a telephone (represented by a telephone number, for instance) or a VoIP endpoint; and/or (c) an identity of the second entity 104, e.g., a name and/or a nickname and/or a code name and/or a role (e.g., administrative assistant, salesman, engineer, etc.) of the second entity 104, a telephone number associated with the second entity 104, an Internet Protocol ("IP") address associated with the second entity 104, and/or an email address associated with the second entity 104.

A communication scenario identifier may also include but not be limited to one or more indications of a relationship between the first entity 102 and the second entity 104, e.g., business, family, social; one or more indications of a relative priority of communications between the first entity 102 and the second entity 104, e.g., as compared with communications between the first entity 102 and other parties besides the second entity 104, e.g., during business hours, communications with business associates are more important than with second entity 104, a social contact, but during non-business hours, communications with the second entity 104 is more important than communications with business associates.

A communication scenario identifier may be transmitted in conjunction with a communication within the communication scenario. For example, if the communication within the communication scenario is a telephone call reply from the first entity 102 to the second entity 104 to a telephone call from the second entity 104 to the first entity 102, a communication scenario identifier associated with a false telephone number and/or a false name may be transmitted in conjunction with the reply telephone call, such that the false telephone number and false name, both associated with the first entity 102, appear on a caller identification feature of the telephone of the first entity 102. Further, a communication scenario identifier may give rise to a presentation feature in conjunction with a communication within the communication scenario. For example, if the communication within the communication scenario is a VoIP call from the first entity 102 to the second entity 104, a communication scenario identifier associated with a false telephone number and/or a false name may give rise to a presentation feature in conjunction with the VoIP call, e.g., via text and/or graphics via a visual presentation device and/or an audio announcement via a speaker and/or a specific vibration pattern via a vibration device of the user interface of the system 106 associated with the first entity 102, for purposes, e.g., of reminding the first entity 102 of the communication scenario involving the second entity 104.

A first identifier and/or a second identifier and/or a communication scenario identifier may be generated and/or established and/or stored and/or transmitted using the memory resources and/or hardware/software/firmware of the communication mediating system 112 and/or memory resources and/or hardware/software/firmware operably coupled to the communication mediating system 112.

The communication mediating system 112 may transmit a signal to activate at least a portion of a system 106 associated with the first entity 102, where the transmitting is responsive to, e.g., the second entity 104 inputting the first identifier to initiate a communication with the first entity 102, or, e.g., the first entity 102 inputting the second identifier to initiate a communication with the second entity 104. The first identifier and/or the second identifier may, for instance, include a telephone number. The at least a portion of the system 106 associated with the first entity 102 may include, for example, a ringer for signaling an incoming call, a voice-mail feature, a return message feature, a display feature and/or some other visual and/or audio and/or tactile presentation device. The communication mediating system 112 may transmit a signal to present a first identifier and/or a second identifier and/or a communication scenario identifier using a presentation feature and/or device of a system 106 associated with the first entity 102, such as a computer display screen and/or a caller identification feature and/or a speaker and/or a vibration device.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
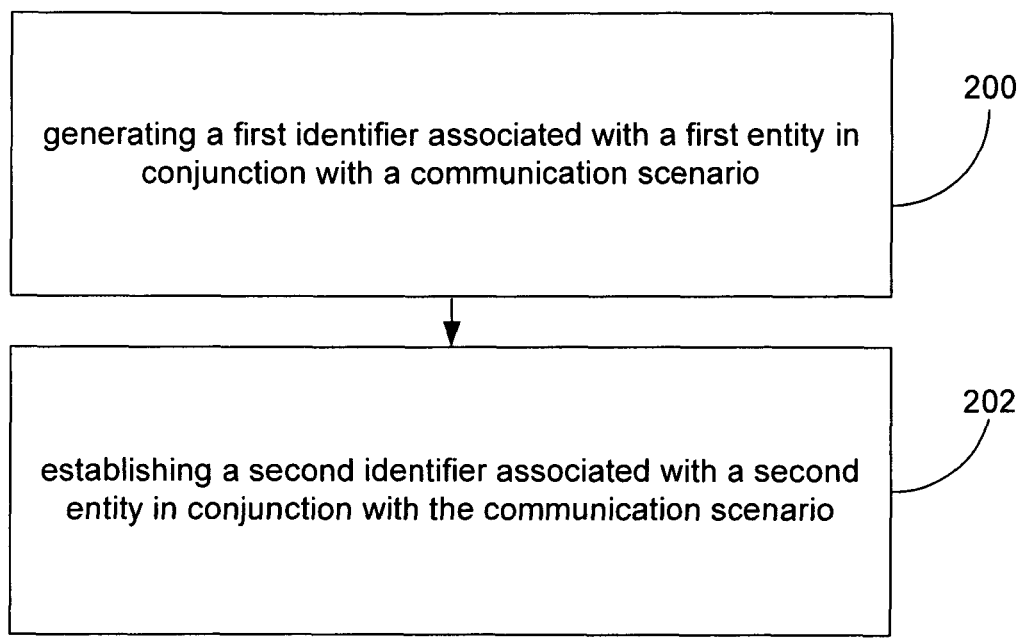
FIG. 2 depicts a high-level logic flowchart of an operational process.

FIG. 2 depicts a high-level logic flowchart of an operational process. The illustrated process may include operation 200 and/or operation 202.

Operation 200 illustrates generating a first identifier associated with a first entity in conjunction with a communication scenario. Operation 200 may include, for example, generating a first identifier associated with a first entity in conjunction with a communication scenario, where a first entity 102 may desire the generation of a first identifier, such as a secondary telephone number and/or a name and/or a nickname and/or a role to be given to a second entity 104, in a particular communication scenario, such as an intended continuing relationship including communication, e.g., a continuing social and/or a business and/or an investigative relationship. For example, a first entity 102 such as a single male may desire the generation of a first identifier such as a secondary, unlisted telephone number (e.g., 111-111-1111) that may be used to call him on a cell phone with a different primary telephone number (e.g., 222-222-2222), to give to a second entity 104 such as a single female he met at a party. The first entity 102 may request the generation of the desired first identifier from a third party, e.g., his VoIP service provider, which uses its hardware/software/firmware resources associated with a communication mediating system 112 to generate the desired first identifier, which may be transmitted to a system 106 associated with the first entity 102, e.g., the cell phone or personal digital assistant of the first entity 102 for distribution to the second entity 104.

Alternatively and/or in conjunction with the foregoing example, a first entity 102 such as a law enforcement investigator may desire the generation of a first identifier such as a secondary, unlisted telephone number (e.g., 333-333-3333) that may be used to call him on a cell phone with a different primary telephone number (e.g., 444-444-4444), to give to a second entity 104 such as an investigation target. The first entity 102 may request the generation of the desired first identifier from a third party, e.g., his VoIP service provider, which uses its hardware/software/firmware resources associated with a communication mediating system 112 to generate the desired first identifier, which the VoIP service provider may use to route calls placed to the telephone number of the first identifier to a VoIP endpoint, e.g., a system 106 associated with the first entity 102, and which may be transmitted to a system 106 associated with the first entity 102, e.g., the cell phone or personal digital assistant of the first entity 102 so that the first entity 102 may distribute the first identifier to the second entity 104.

The generating of operation 200 may be performed using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Operation 202 depicts establishing a second identifier associated with a second entity in conjunction with the communication scenario. Operation 202 may include, for example, establishing a second identifier associated with a second entity in conjunction with the communication scenario, where a first entity 102 may desire the establishment of a second identifier signifying, e.g., a location of the second entity 104 (e.g., home or work) and/or a system (e.g., a system 106 associated with the second entity 104 such as a cell phone) and/or an identity of the second entity 104 (e.g., a name and/or a nickname and/or a code name and/or a role), in a particular communication scenario such as an intended continuing relationship including communication, e.g., a continuing social and/or a business and/or an investigative relationship. For example, a first entity 102 such as a single male may desire the establishment of a second identifier including a nickname and/or a location, to be associated with the second entity 104, a single female he met at a bar, e.g., the nickname and the name of the bar at which the first entity 102 met the second entity 104, in the context of the communication scenario, e.g., a continuing social relationship between the first entity 102 and the second entity 104. The first entity 102 may request the establishment of the second identifier from a third party, e.g., his VoIP service provider, which uses its hardware/software/firmware resources associated with a communication mediating system 112 to establish, e.g., store in memory, the desired second identifier, and which may be transmitted to a system 106 associated with the first entity 102, e.g., the cell phone or personal digital assistant of the first entity 102, so that the first entity 102 may refer to the second identifier, e.g., as an aid to memory.

Alternatively and/or in conjunction with the foregoing example, a first entity 102 such as an intelligence operative may desire the establishment of a second identifier signifying, e.g., a location of the second entity 104 (e.g., home or work) and/or a system (e.g., a system 106 associated with the second entity 104 such as a cell phone) and/or an identity of the second entity 104 (e.g., a name and/or a nickname and/or a code name and/or a role), in a particular communication scenario such as an intended continuing relationship including communication, e.g., an intelligence collection effort conducted by the first entity 102 using the second entity 104. The first entity 102 may request the establishment of the second identifier from a third party, e.g., his VoIP service provider, which uses its hardware/software/firmware resources associated with a communication mediating system 112 to establish, e.g., store in memory, the desired second identifier, and which may be transmitted to a system 106 associated with the first entity 102, e.g., the cell phone or personal digital assistant of the first entity 102 so that the first entity 102 may refer to the second identifier, e.g., as an aid to memory.

The establishing of operation 202 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Figure 3:
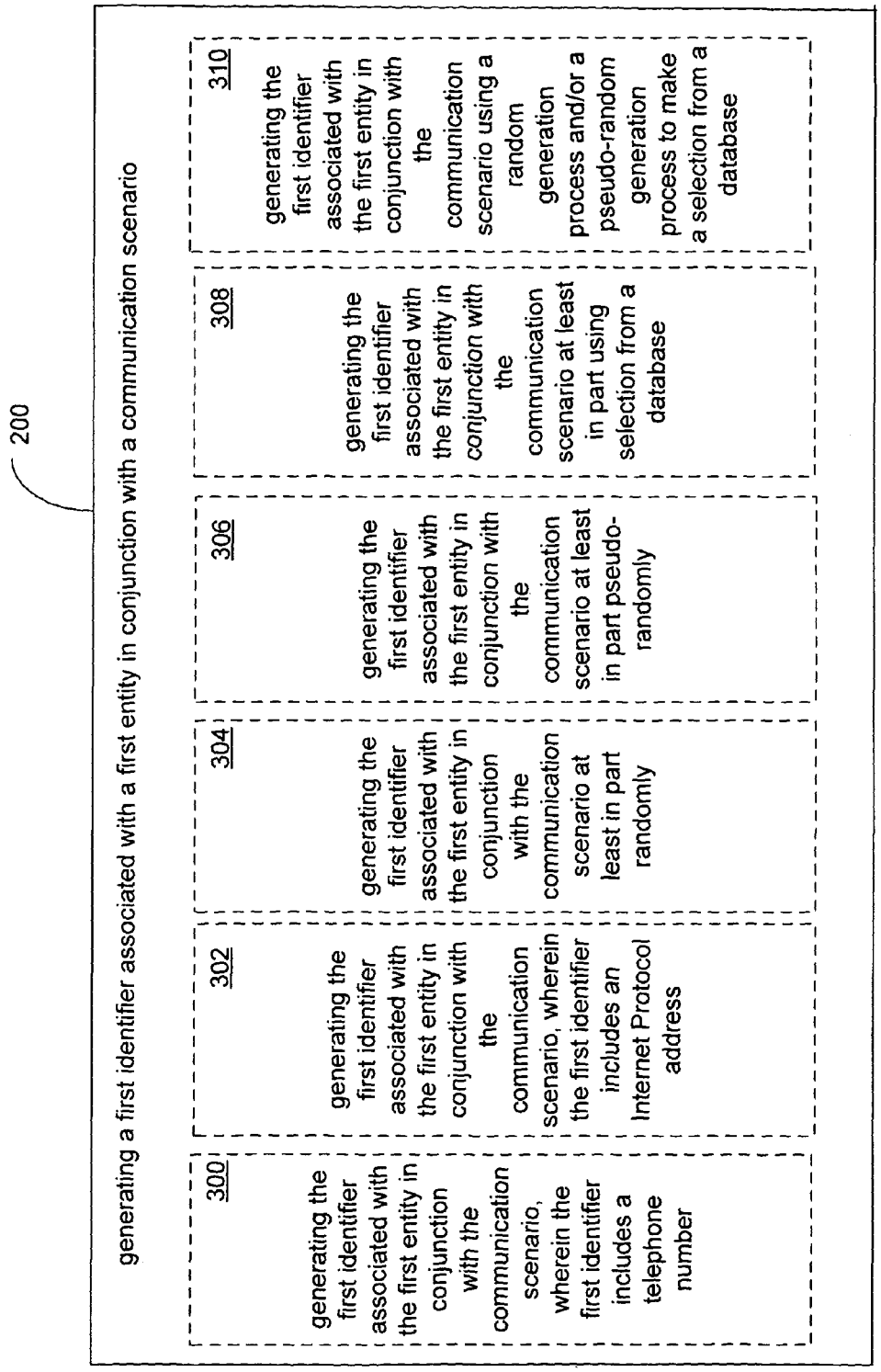
FIG. 3 depicts several alternative implementations of the high-level logic flowchart of FIG. 2.

FIG. 3 depicts several alternative implementations of the high-level logic flowchart of FIG. 2. Operation 200—generating a first identifier associated with a first entity in conjunction with a communication scenario—may include one or more of the following operations: 300, 302, 304, 306, 308, and/or 310.

Operation 300 shows generating the first identifier associated with the first entity in conjunction with the communication scenario, wherein the first identifier includes a telephone number. Operation 300 may include, for example, generating the first identifier associated with the first entity in conjunction with the communication scenario, wherein the first identifier includes a telephone number, where a first entity 102, e.g., a woman, may desire the generation of a first identifier including a telephone number, e.g., 111-111-1111, to serve as a proxy for the primary telephone number of a system 106 associated with her, e.g., her VoIP endpoint, for distribution to a second entity 104, a man she met at a party.

The generating of operation 300 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Operation 302 depicts generating the first identifier associated with the first entity in conjunction with the communication scenario, wherein the first identifier includes an Internet Protocol address. Operation 302 may include, for instance, generating the first identifier associated with the first entity in conjunction with the communication scenario, wherein the first identifier includes an Internet Protocol address, where a first entity 102, e.g., an undercover police detective, may desire the generation a first identifier including an IP address, e.g., 000.000.0.0, to serve as a proxy for the primary IP address of a system 106 associated with her, e.g., her personal computer, for distribution to a second entity 104, an informant in an investigation.

The generating of operation 302 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Operation 304 illustrates generating the first identifier associated with the first entity in conjunction with the communication scenario at least in part randomly. Operation 304 may include, for example, generating the first identifier associated with the first entity in conjunction with the communication scenario at least in part randomly, where a first entity 102, e.g., a spy, may desire the generation of a first identifier including an IP address, e.g., 000.000.0.0, to serve as a proxy for the primary IP address of a system 106 associated with him, e.g., his personal computer, for distribution to a second entity 104, e.g., an agent-in-place in an enemy organization, and where the first identifier is generated at least in part randomly using the hardware/software/firmware of a quasi-privately controlled communication mediating system 112.

The generating of operation 304 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Operation 306 illustrates generating the first identifier associated with the first entity in conjunction with the communication scenario at least in part pseudo-randomly. Operation 306 may include, for instance, generating the first identifier associated with the first entity in conjunction with the communication scenario at least in part pseudo-randomly, where a first entity 102, e.g., a private investigator, may desire the generation of a first identifier including a telephone number, e.g., 555-555-5555, to serve as a proxy for the primary telephone number of a system 106 associated with him, e.g., his office telephone, for distribution to a second entity 104, e.g., an investigation target, and where the first identifier is generated at least in part pseudo-randomly using the hardware/software/firmware of a commercial telephone company's communication mediating system 112.

The generating of operation 306 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Operation 308 depicts generating the first identifier associated with the first entity in conjunction with the communication scenario at least in part using selection from a database. Operation 308 may include, for example, generating the first identifier associated with the first entity in conjunction with the communication scenario at least in part using selection from a database, where a first entity 102, e.g., a police detective, may desire the generation of a first identifier including an IP address, e.g., 000.000.0.0, to serve as a proxy for the primary IP address of a system 106 associated with him, e.g., his personal computer at work, for distribution to a second entity 104, e.g., an informant in a criminal enterprise, and where the first identifier is generated at least in part using selection of the first identifier, the IP address, from a database of available IP addresses using the hardware/software/firmware of a commercial entity's communication mediating system 112.

The generating of operation 308 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Operation 310 depicts generating the first identifier associated with the first entity in conjunction with the communication scenario using a random generation process and/or a pseudo-random generation process to make a selection from a database. Operation 310 may include, for example, generating the first identifier associated with the first entity in conjunction with the communication scenario using a random generation process and/or a pseudo-random generation process to make a selection from a database, where a first entity 102, e.g., a first male patron of a bar, may desire the generation of a first identifier including telephone number, e.g., 666-666-6666, to serve as a proxy for the primary telephone number of a system 106 associated with him, e.g., his VoIP endpoint, a home personal computer, for distribution to a second entity 104, e.g., another male patron of the bar, and where the first identifier is generated at least in part using a pseudo-random number generator to determine an address of a database entry in a database of available telephone numbers using the hardware/software/firmware of a commercial entity's communication mediating system 112.

The generating of operation 310 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Figure 4A:
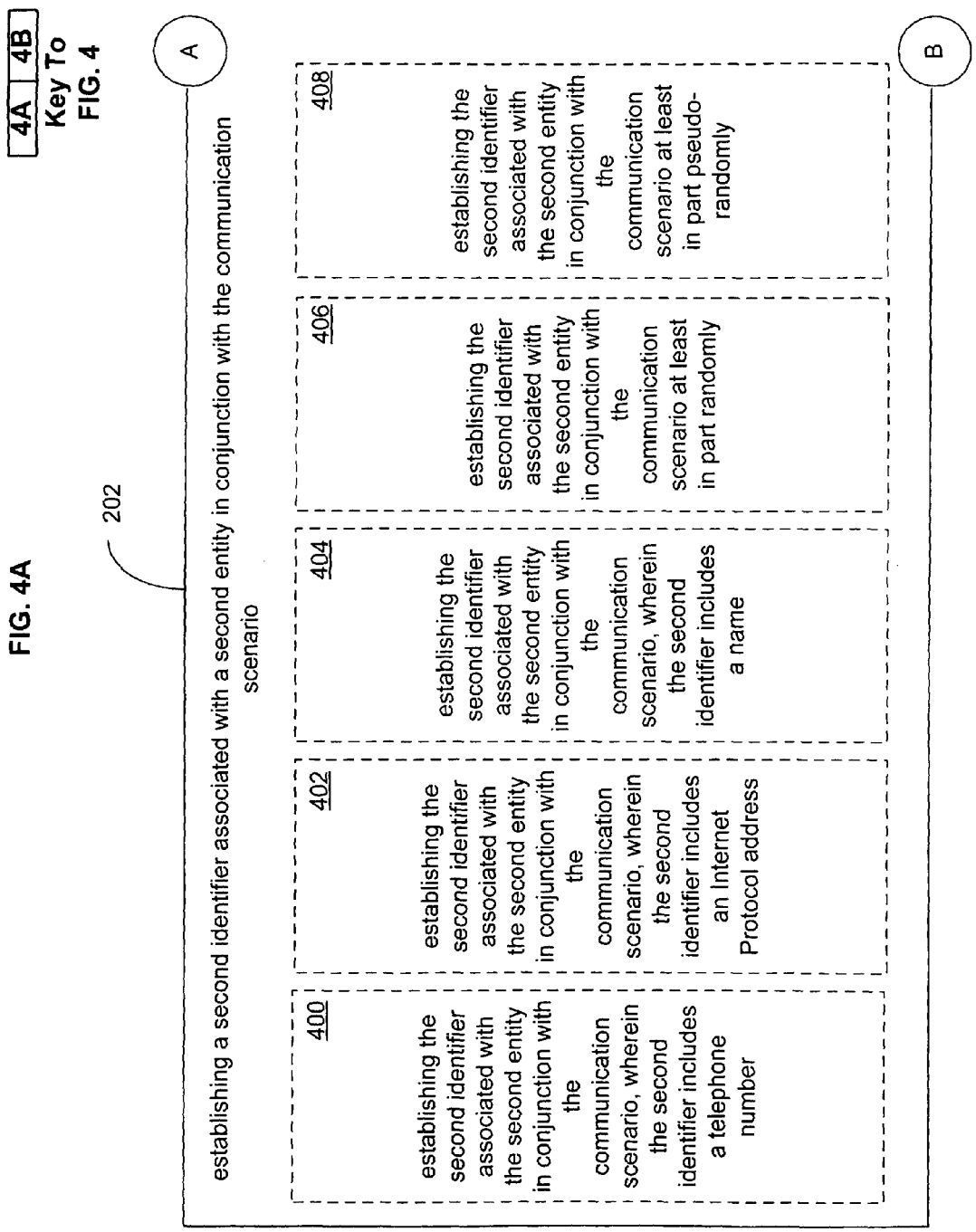
FIG. 4 depicts several alternative implementations of the high-level logic flowchart of FIG. 2.
Figure 4B:
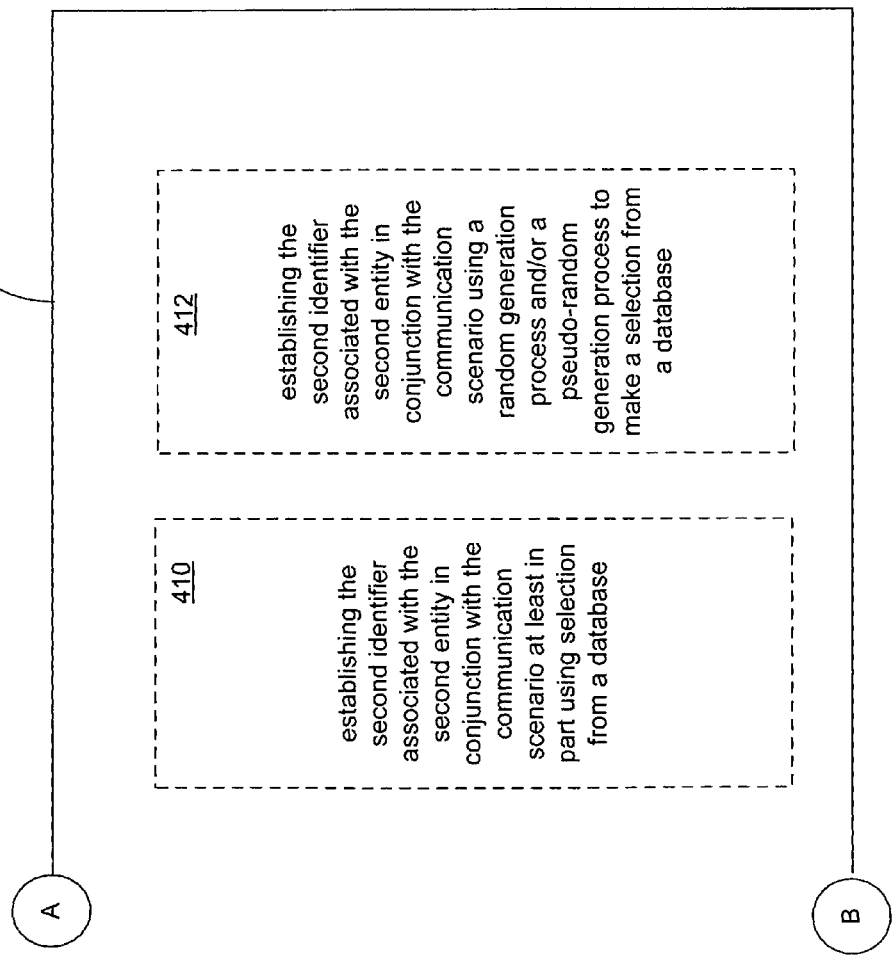

FIG. 4 depicts several alternative implementations of the high-level logic flowchart of FIG. 2. Operation 202—establishing a second identifier associated with a second entity in conjunction with the communication scenario—may include one or more of the following operations: 400, 402, 404, 406, 408, 410, and/or 412.

Operation 400 shows establishing the second identifier associated with the second entity in conjunction with the communication scenario, wherein the second identifier includes a telephone number. Operation 400 may include, for instance, establishing the second identifier associated with the second entity in conjunction with the communication scenario, wherein the second identifier includes a telephone number, where a first entity 102 such as a woman may desire the establishment of a second identifier signifying, e.g., a location of a second entity 104 (e.g., meeting place or vacation location) and/or a system (e.g., a system 106 associated with a second entity 104 such as a cell phone) and/or an identity of the second entity 104 (e.g., a name and/or a nickname and/or a code name and/or a role), in a particular communication scenario such as an intended continuing relationship including communication, e.g., a continuing social and/or a business and/or an investigative relationship. For example, a first entity 102 such as a woman may desire the establishment of a second identifier including a telephone number, e.g., 777-777-7777, associated with a system 106 associated with the second entity 104, a group of people encountered on vacation, such as a vacation telephone, in the context of a communication scenario such as a social relationship between the first entity 102 and the second entity 104 while on vacation. The first entity 102 may request the establishment of the second identifier from a third party, e.g., her telephone service provider, which uses its hardware/software/firmware resources associated with a communication mediating system 112 to establish, e.g., store in memory, the desired second identifier, which may be transmitted to a system 106 associated with the first entity 102, e.g., the cell phone or personal digital assistant of the first entity 102, so that the first entity 102 may refer to the second identifier, e.g., as an aid to memory.

The establishing of operation 400 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Operation 402 depicts establishing the second identifier associated with the second entity in conjunction with the communication scenario, wherein the second identifier includes an Internet Protocol address. Operation 402 may include, for example, establishing the second identifier associated with the second entity in conjunction with the communication scenario, wherein the second identifier includes an Internet Protocol address, where the first entity 102, e.g., a businessperson, may desire the establishment of a second identifier signifying, e.g., a location of a second entity 104 (e.g., meeting place or business location) and/or a system (e.g., a system 106 associated with a second entity 104 such as a cell phone) and/or an identity of the second entity 104 (e.g., a name and/or a nickname and/or a code name and/or a role), in a particular communication scenario such as an intended continuing relationship including communication, e.g., a continuing social and/or a business and/or an investigative relationship. For example, the first entity 102 who is a businessperson may desire the establishment of a second identifier including, e.g., IP address 000.000.0.0, associated with a system 106 such as a computer associated with a second entity 104, e.g., a negotiation interlocutor, in the context of a communication scenario, e.g., a secret business negotiation. The first entity 102 may request the establishment of the second identifier from a third party, e.g., a commercial entity, which uses its hardware/software/firmware resources associated with a communication mediating system 112 to establish, e.g., store in memory, the desired second identifier, which may be transmitted to a system 106 associated with the first entity 102, e.g., the office phone or personal digital assistant of the first entity 102, so that the first entity 102 may refer to the second identifier, e.g., as verification of an element of commercial security.

The establishing of operation 402 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Operation 404 shows establishing the second identifier associated with the second entity in conjunction with the communication scenario, wherein the second identifier includes a name. Operation 404 may include, for example, establishing the second identifier associated with the second entity in conjunction with the communication scenario, wherein the second identifier includes a name, where a first entity 102 such as a police detective may desire the establishment of a second identifier signifying a location of a second entity 104 (e.g., home or work location) and/or a system (e.g., a system 106 associated with the second entity 104 such as a cell phone) and/or an identity of a second entity 104 (e.g., a name and/or a nickname and/or a code name and/or a role), in a particular communication scenario such as an intended continuing relationship including communication, e.g., a continuing social and/or a business and/or an investigative relationship. For example, a first entity 102 who is a police detective may desire the establishment of a second identifier including a name, e.g., a code name, such as a system 106, such as a personal computer associated with the second entity 104, such as an investigation target, in the context of a communication scenario such as an ongoing investigation. The first entity 102 may request the establishment of the second identifier from a third party, e.g., a VoIP service provider, which uses its hardware/software/firmware resources associated with a communication mediating system 112 to establish, e.g., store in memory, the desired second identifier, which may be transmitted to a system 106 associated with the first entity 102, e.g., the personal computer used for VoIP calls by the first entity 102, so that the first entity 102 may refer to the second identifier, e.g., for verification of the second identifier.

The establishing of operation 404 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Operation 406 illustrates establishing the second identifier associated with the second entity in conjunction with the communication scenario at least in part randomly. Operation 406 may include, for instance, establishing the second identifier associated with the second entity in conjunction with the communication scenario at least in part randomly, where the first entity 102, e.g., an intelligence agent, may desire the establishment of a second identifier signifying, e.g., a location of a second entity 104 (e.g., meeting place or vacation location) and/or a system (e.g., a system 106 associated with a second entity 104 such as a cell phone) and/or an identity of the second entity 104 (e.g., a name and/or a nickname and/or a code name and/or a role), in a particular communication scenario such as an intended continuing relationship including communication, e.g., a continuing social and/or a business and/or an investigative relationship. For example, a first entity 102 who is an intelligence agent may desire the establishment of a second identifier including, e.g., a code name and a fictitious location, associated with a second entity 104, e.g., an informant, in the context of a communication scenario, e.g., an intelligence gathering operation. The first entity 102 may request the establishment of the second identifier from a third party, e.g., a quasi-private commercial entity, which uses its hardware/software/firmware resources associated with a communication mediating system 112 to establish, e.g., using a random process to select a code name and/or a fictitious location and storing them, the desired second identifier, which may be transmitted to a system 106 associated with the first entity 102, e.g., the cell phone or personal digital assistant of the first entity 102, so that the first entity 102 may refer to the second identifier, e.g., as verification of an element of operational security.

The establishing of operation 406 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Operation 408 shows establishing the second identifier associated with the second entity in conjunction with the communication scenario at least in part pseudo-randomly. Operation 408 may include for example, establishing the second identifier associated with the second entity in conjunction with the communication scenario at least in part pseudo-randomly, where the first entity 102, e.g., a businessperson, may desire the establishment of a second identifier signifying, e.g., a location of a second entity 104 (e.g., meeting place or business location) and/or a system (e.g., a system 106 associated with a second entity 104 such as a cell phone) and/or an identity of the second entity 104 (e.g., a name and/or a nickname and/or a code name and/or a role), in a particular communication scenario such as an intended continuing relationship including communication, e.g., a continuing social and/or a business and/or an investigative relationship. For example, the first entity 102 who is a businessperson may desire the establishment of a second identifier including, e.g., a code name and a fictitious location, associated with a second entity 104, e.g., a negotiation interlocutor, in the context of a communication scenario, e.g., a secret business negotiation. The first entity 102 may request the establishment of the second identifier from a third party, e.g., a commercial entity, which uses its hardware/software/firmware resources associated with a communication mediating system 112 to establish, e.g., using a pseudo-random number generator to generate a code name and/or a fictitious location and storing them, the desired second identifier, which may be transmitted to a system 106 associated with the first entity 102, e.g., the office phone or personal digital assistant of the first entity 102, so that the first entity 102 may refer to the second identifier, e.g., as verification of an element of commercial security.

The establishing of operation 408 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Operation 410 shows establishing the second identifier associated with the second entity in conjunction with the communication scenario at least in part using selection from a database. Operation 410 may include, for example, establishing the second identifier associated with the second entity in conjunction with the communication scenario at least in part using selection from a database, where the first entity 102, e.g., an intelligence agent, may desire the establishment of a second identifier signifying, e.g., a location of a second entity 104 (e.g., meeting place or vacation location) and/or a system (e.g., a system 106 associated with a second entity 104 such as a cell phone) and/or an identity of the second entity 104 (e.g., a name and/or a nickname and/or a code name and/or a role), in a particular communication scenario such as an intended continuing relationship including communication, e.g., a continuing social and/or a business and/or an investigative relationship. For example, a first entity 102 who is an intelligence agent may desire the establishment of a second identifier including, e.g., a code name and a fictitious location, associated with a second entity 104, e.g., an informant, in the context of a communication scenario, e.g., an intelligence gathering operation. The first entity 102 may request the establishment of the second identifier from a third party, e.g., a quasi-private commercial entity, which uses its hardware/software/firmware resources associated with a communication mediating system 112 to establish, e.g., using selection of a code name and/or a fictitious location from one or more databases and storing them, the desired second identifier, which may be transmitted to a system 106 associated with the first entity 102, e.g., the cell phone or personal digital assistant of the first entity 102, so that the first entity 102 may refer to the second identifier, e.g., as verification of an element of operational security.

The establishing of operation 410 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Operation 412 illustrates establishing the second identifier associated with the second entity in conjunction with the communication scenario using a random generation process and/or a pseudo-random generation process to make a selection from a database. Operation 412 may include, for example, establishing the second identifier associated with the second entity in conjunction with the communication scenario using a random generation process and/or a pseudo-random generation process to make a selection from a database, where the first entity 102, e.g., a police detective, may desire the establishment of a second identifier signifying, e.g., a location of a second entity 104 (e.g., meeting place or vacation location) and/or a system (e.g., a system 106 associated with a second entity 104 such as a cell phone) and/or an identity of the second entity 104 (e.g., a name and/or a nickname and/or a code name and/or a role), in a particular communication scenario such as an intended continuing relationship including communication, e.g., a continuing social and/or a business and/or an investigative relationship. For example, a first entity 102 who is a police detective may desire the establishment of a second identifier including, e.g., a code name and a fictitious location, associated with a second entity 104, e.g., an informant, in the context of a communication scenario, e.g., an intelligence gathering operation. The first entity 102 may request the establishment of the second identifier from a third party, e.g., a quasi-private commercial entity, which uses its hardware/software/firmware resources associated with a communication mediating system 112 to establish, e.g., using a random process and/or a pseudo-random process to select a code name and/or a fictitious location from one or more databases and storing them, the desired second identifier, which may be transmitted to a system 106 associated with the first entity 102, e.g., the cell phone or personal digital assistant of the first entity 102, so that the first entity 102 may refer to the second identifier, e.g., as verification of an element of investigative security.

The establishing of operation 412 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Figure 5:
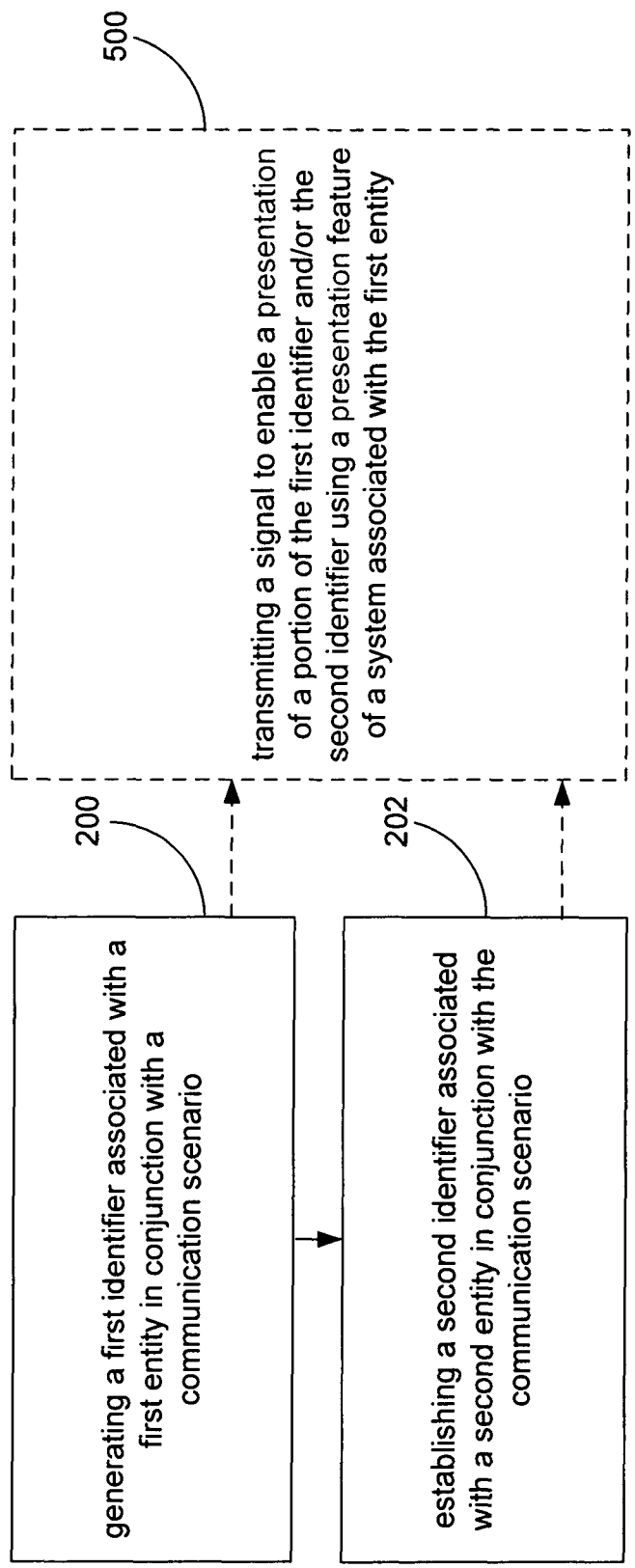
FIG. 5 depicts a high-level logic flowchart of an operational process.

FIG. 5 depicts a high-level logic flowchart of an operational process. The depicted process may include one or more of the following operations: 200 (described elsewhere herein), 202 (described elsewhere herein), and/or 500.

Operation 500 shows transmitting a signal to enable a presentation of a portion of the first identifier and/or the second identifier using a presentation feature of a system associated with the first entity. Operation 500 may include, for instance, transmitting a signal to enable a presentation of a portion of the first identifier and/or the second identifier using a presentation feature of a system associated with the first entity, where a communication mediating system 112 may be used to transmit a signal to enable an activation of a visual presentation feature (e.g., a caller identification display and/or a graphical user interface feature) and/or an audio presentation feature (e.g. a speaker) and/or a tactile presentation feature (e.g., a vibration device) of a system 106, e.g., a personal computer associated with a first entity 102 (such as a person communicating in a social communication scenario). The transmitting may be responsive to, e.g., input from the first entity 102 requesting the transmitting a first identifier and/or a second identifier, and/or to input of a portion of a first identifier and/or a second identifier by the first entity 102 and/or the second entity 104 to initiate a communication in conjunction with the communication scenario.

For example, a commercial communication mediating system 112 such as that controlled by a commercial VoIP services provider may be used to transmit a signal to activate a ringer and/or a call identification display and/or a computer graphical user interface and/or a speaker and/or a vibration device of a system 106 associated with a first entity 102 (e.g., a man), where the transmission is responsive to a first entity 102 inputting a portion of a second identifier and thereby initiating dialing a VoIP telephone number included in the second identifier associated with a second entity 104 (e.g., a woman) to initiate a communication in conjunction with a social communication scenario such as dating, and/or where the transmission is responsive to a second entity 104 (e.g., the woman) calling a first entity 102 (e.g., the man, who gave the second entity 104 a first identifier associated with him and including a secondary, unlisted VoIP telephone number) inputting a portion of the first identifier and thereby initiating dialing of the secondary, unlisted VoIP telephone number included in the first identifier to initiate a communication in conjunction with a social communication scenario.

Alternatively and/or in conjunction with the immediately foregoing example, a commercial communication mediating system 112 such as that controlled by a commercial VoIP services provider may be used to transmit a signal to activate a ringer and/or a call identification display and/or a computer graphical user interface and/or a speaker and/or a vibration device of a system 106 associated with a first entity 102 (e.g., a man), where the transmission is responsive to a first entity 102 inputting a request for a first identifier associated with him and/or a second identifier associated with a second entity 104 in the context of a social communication scenario for, e.g., verification of information included in the first identifier and/or the second identifier and/or for recalling such information to assist the memory of the first entity 102.

The transmitting of operation 500 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Figure 6:
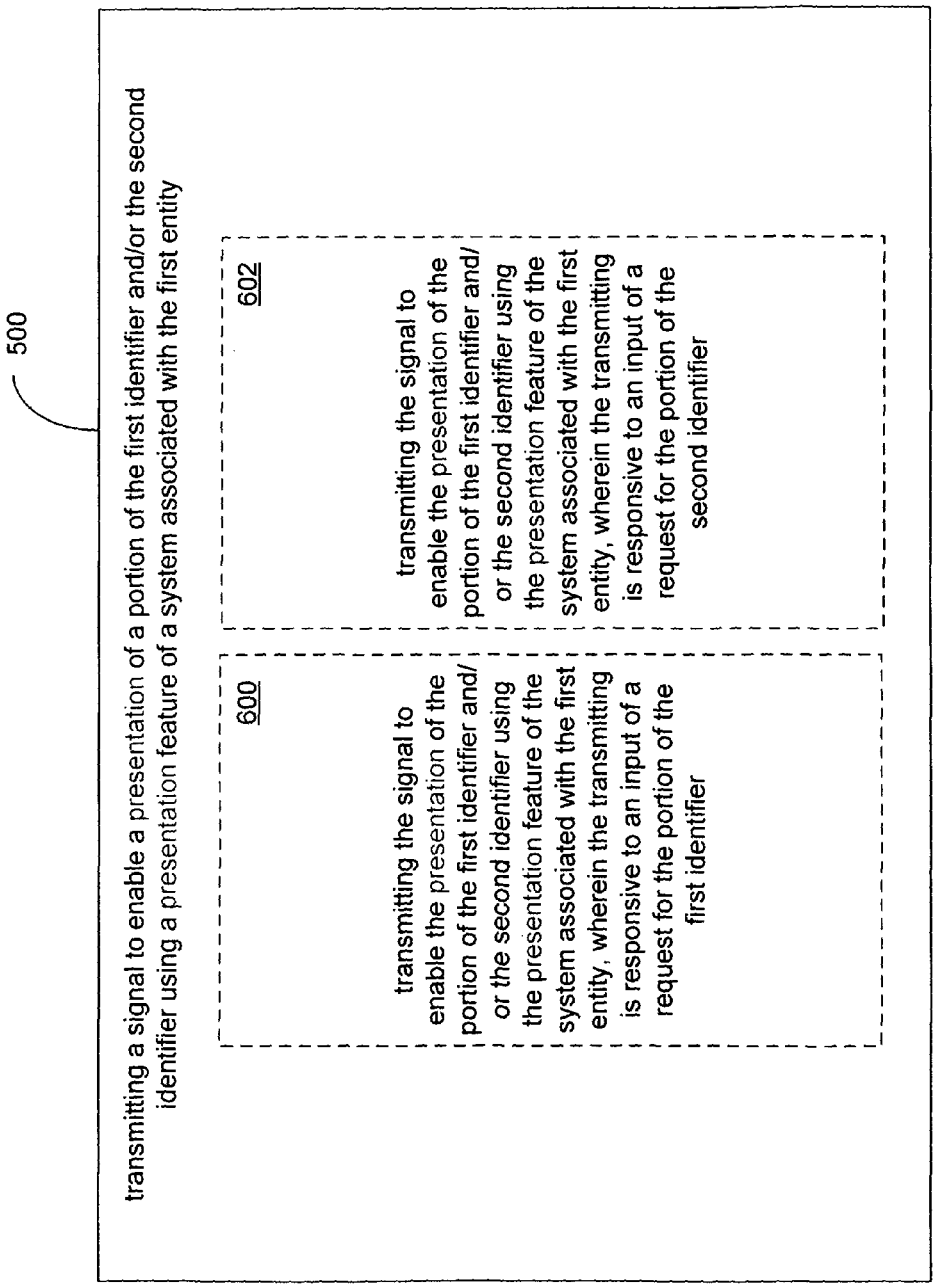
FIG. 6 depicts several alternative implementations of the high-level logic flowchart of FIG. 5.

FIG. 6 depicts several alternative implementations of the high-level logic flowchart of FIG. 5. Operation 500-transmitting a signal to enable a presentation of a portion of the first identifier and/or the second identifier using a presentation feature of a system associated with the first entity-may include operations 600 and/or 602.

Operation 600 shows transmitting the signal to enable the presentation of the portion of the first identifier and/or the second identifier using the presentation feature of the system associated with the first entity, wherein the transmitting is responsive to an input of a request for the portion of the first identifier. Operation 600 may include, for instance, transmitting the signal to enable the presentation of the portion of the first identifier and/or the second identifier using the presentation feature of the system associated with the first entity, wherein the transmitting is responsive to an input of a request for the portion of the first identifier, where a communication mediating system 112 may be used to transmit a signal to enable an activation of at least a portion of a system 106, such as a presentation device, e.g., a ringer and/or a speaker and/or a vibration device and/or a caller identification display and/or a graphical user interface feature of a system 106, e.g., a telephone associated with a first entity 102 (such as a person communicating in a business communication scenario). The transmitting may be responsive, e.g., to input from the first entity 102 requesting the transmitting a first identifier and/or a second identifier, and/or to input of a portion of a first identifier and/or a second identifier by the first entity 102 and/or the second entity 104 to initiate a communication in conjunction with the communication scenario.

For example, a commercial communication mediating system 112 such as that controlled by a commercial VoIP services provider may be used to transmit a signal to activate a ringer and/or a speaker and/or a vibration device and/or a call identification display and/or a computer graphical user interface of a system 106 associated with a first entity 102 (e.g., a first businessperson), where the transmission is responsive to a first entity 102 inputting a portion of a second identifier and thereby initiating dialing a VoIP telephone number included in the second identifier associated with a second entity 104 (e.g., a second businessperson) to initiate a communication in conjunction with a business communication scenario such as a confidential negotiation, and/or where the transmission is responsive to a second entity 104 (e.g., the second businessperson) calling a first entity 102 (e.g., the first business person, who gave the second entity 104 a first identifier associated with him (the first entity 102) and including a secondary, unlisted VoIP telephone number) inputting a portion of the first identifier and thereby initiating dialing of the secondary, unlisted VoIP telephone number included in the first identifier to initiate a communication in conjunction with a social communication scenario.

Alternatively and/or in conjunction with the immediately foregoing example, a commercial communication mediating system 112 such as that controlled by a commercial VoIP services provider may be used to transmit a signal to activate a ringer and/or a speaker and/or a vibration device and/or a call identification display and/or a computer graphical user interface of a system 106 associated with a first entity 102 (e.g., a first businessperson), where the transmission is responsive to a first entity 102 inputting a request for a first identifier associated with him (the first entity 102) and/or a second identifier associated with a second entity 104 in the context of a business communication scenario for, e.g., verification of information included in the first identifier and/or the second identifier and/or for recalling such information to assist the memory of the first entity 102.

The transmitting of operation 600 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firm ware of a system 106 associated with the first entity 102 and/or hardware/software/firmware operably coupled to the system 106 associated with the first entity 102.

Operation 602 depicts transmitting the signal to enable the presentation of the portion of the first identifier and/or the second identifier using the presentation feature of the system associated with the first entity, wherein the transmitting is responsive to an input of a request for the portion of the second identifier. Operation 602 may include, for instance, transmitting the signal to enable the presentation of the portion of the first identifier and/or the second identifier using the presentation feature of the system associated with the first entity, wherein the transmitting is responsive to an input of a request for the portion of the second identifier, where a communication mediating system 112 may be used to transmit a signal to enable an activation of at least a portion of a system 106, such as that announcing an incoming call via a presentation device, e.g., a ringer and/or a speaker and/or a vibration device, and/or a caller identification display and/or a graphical user interface feature of a system 106, e.g., a VoIP endpoint associated with a first entity 102 (such as a person communicating in an investigative communication scenario). The transmitting may be responsive to, e.g., input from the first entity 102 requesting the transmitting a first identifier and/or a second identifier, and/or to input of a portion of a first identifier and/or a second identifier by the first entity 102 and/or the second entity 104 to initiate a communication in conjunction with the communication scenario.

For example, a commercial communication mediating system 112 such as that controlled by a commercial VoIP services provider may be used to transmit a signal to activate a ringer and/or a speaker and/or a vibration device and/or a call identification display and/or a computer graphical user interface of a system 106 associated with a first entity 102 (e.g., an undercover police investigator), where the transmission is responsive to a first entity 102 inputting a portion of a second identifier and thereby initiating entering an IP address included in the second identifier associated with a second entity 104 (e.g., an investigation target) to initiate a communication in conjunction with an investigative communication scenario such as an investigation of the activities of the second entity 104, and/or where the transmission is responsive to a second entity 104 (e.g., the investigative target) calling a first entity 102 (e.g., the undercover police investigator, who gave the second entity 104 a first identifier associated with him (the first entity 102) and including an IP address not traceable to a computer identifiable with the true identity of the first entity 102) inputting a portion of the first identifier and thereby initiating input of the IP address included in the first identifier to initiate a communication in conjunction with an investigative communication scenario.

Alternatively and/or in conjunction with the immediately foregoing example, a commercial communication mediating system 112 such as that controlled by a commercial VoIP services provider may be used to transmit a signal to activate a ringer and/or a speaker and/or a vibration device and/or a call identification display and/or a computer graphical user interface of a system 106 associated with a first entity 102 (e.g., a first businessperson), where the transmission is responsive to a first entity 102 inputting a request for a first identifier associated with him (the first entity 102) and/or a second identifier associated with a second entity 104 in the context of a business communication scenario for, e.g., verification of information included in the first identifier and/or the second identifier and/or for recalling such information to assist the memory of the first entity 102.

The transmitting of operation 602 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Figure 7:
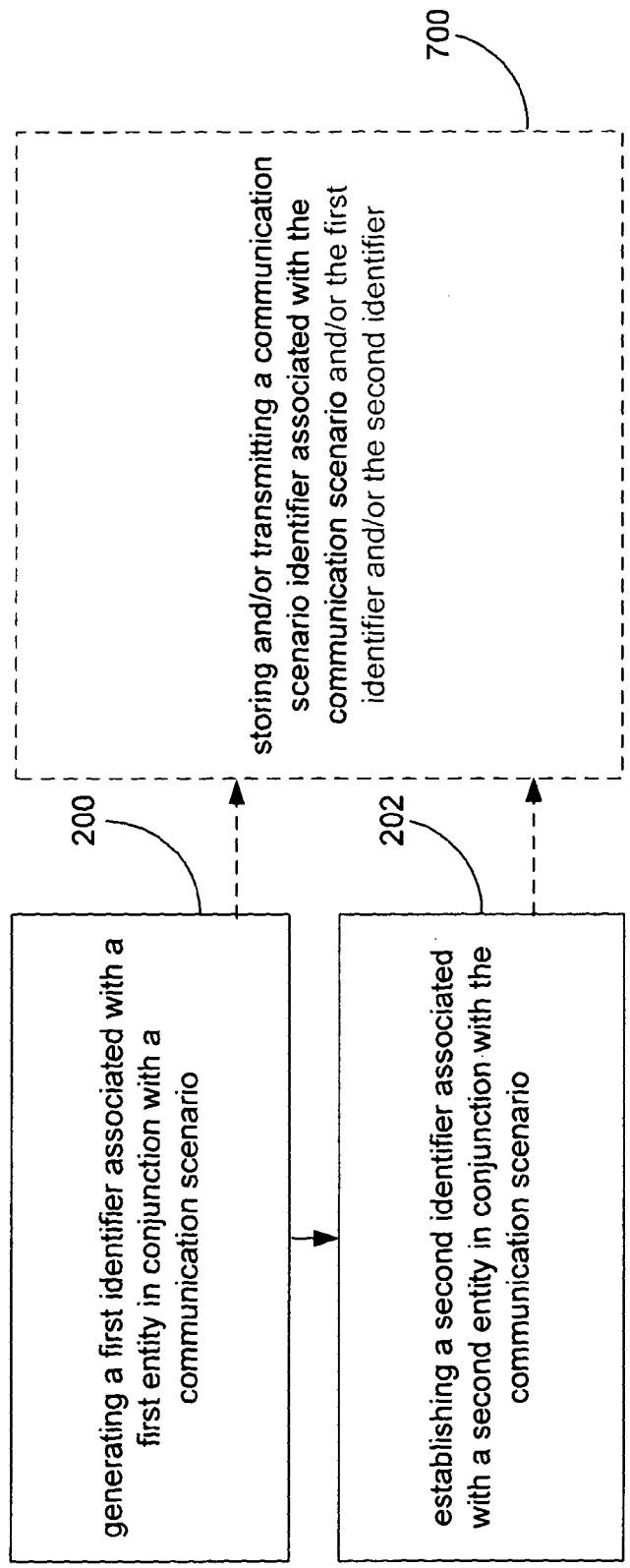
FIG. 7 depicts a high-level logic flowchart of an operational process.

FIG. 7 depicts a high-level logic flowchart of an operational process. The depicted process may include one or more of the following operations: 200 (described elsewhere herein), 202 (described elsewhere herein), and/or 700.

Operation 700 shows storing and/or transmitting a communication scenario identifier associated with the communication scenario and/or the first identifier and/or the second identifier. Operation 700 may include, for example, storing and/or transmitting a communication scenario identifier associated with the communication scenario and/or the first identifier and/or the second identifier, where a commercial communication mediating system 112, e.g., one controlled by a commercial VoIP services provider, stores, e.g., in memory resources associated with the communication mediating system 112, a communication scenario identifier (such as a location name and/or a personal description, associated with a circumstance in-which a particular communication scenario was conceived, such as a name of a bar and a description of an appearance of the second entity 104 in the bar at the time a first entity 102 met the second entity 104), and/or a first identifier associated with a first entity 104 (such as a secondary telephone number and/or a name and/or a nickname and/or a role to be made available to a second entity 104 in a particular communication scenario such as an intended continuing relationship including communication) and/or a second identifier associated with a second entity 104 (e.g., a name and/or a nickname and/or a code name and/or a role for the second entity 104 in a particular communication scenario such as an intended continuing relationship including communication) and/or transmits, using hardware/software/firmware associated with the communication mediating system 112, the exemplar communication scenario identifier and/or the exemplar first identifier and/or the exemplar second identifier, e.g., to a system associated with the first entity 102, such as a personal computer used as a VoIP endpoint.

The storing and/or transmitting of operation 700 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

FIG. 8 depicts several alternative implementations of the high-level logic flowchart of FIG. 7. Operation 700—storing and/or transmitting a communication scenario identifier associated with the communication scenario and/or the first identifier and/or the second identifier—may include one or more of the following operations: 800, and/or 802.

Operation 800 depicts storing the communication scenario identifier associated with the communication scenario and/or the first identifier and/or the second identifier, wherein the communication scenario identifier includes a meeting place and/or a meeting purpose and/or an event and/or a circumstance and/or an account designator and/or a mnemonic item. Operation 800 may include, for example, storing the communication scenario identifier associated with the communication scenario and/or the first identifier and/or the second identifier, wherein the communication scenario identifier includes a meeting place and/or a meeting purpose and/or an event and/or a circumstance and/or an account designator and/or a mnemonic item, where the storing is performed using, e.g., a communication mediating system 112 controlled by a commercial VoIP services provider, and the communication scenario identifier includes information such as a meeting place name (e.g., a bar and/or a conference center, etc.) and/or a meeting purpose (e.g., a business meeting, a debriefing, a personal encounter, etc.) and/or an event (e.g., a conference, a personal encounter, an athletic event, etc.) and/or a circumstance (e.g., a first entity 102 having a broken leg, a second entity 104 telling a particular joke, etc.) and/or an account designator (e.g., a client account number, an informant ID number, etc.) and/or a mnemonic item (e.g., a distinctive word that rhymes with a name of a second entity 104, a distinctive visual image associated with a second entity 104, etc.). The first identifier associated with a first entity 104 may include, for instance, a secondary telephone number and/or a name and/or a nickname and/or a role to be made available to a second entity 104. The second identifier associated with a second entity 104 may include, for example, a name and/or a nickname and/or a code name and/or a role for the second entity 104 in a particular communication scenario.

The storing of operation 800 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Operation 802 shows transmitting a signal to enable a presentation of the communication scenario identifier and/or the first identifier and/or the second identifier using a presentation feature of a system associated with the first identifier. Operation 802 may include, for example, transmitting a signal to enable a presentation of the communication scenario identifier and/or the first identifier and/or the second identifier using a presentation feature of a system associated with the first identifier, where the transmitting may be performed using, e.g., a communication mediating system 112 controlled by a commercial telephony services provider, and where the transmitting may be responsive, e.g., to a request from a first entity 102 and/or to an input initiating a communication in the context of a particular communication scenario (such as responsive to a first entity 102, e.g., a woman, requesting a stored communication scenario identifier and/or a stored first identifier and/or a stored second identifier as an aid to memory, or responsive to an input of a telephone number included in a first identifier and/or a second identifier to initiate a communication in the context of a particular communication scenario, e.g., a first entity 102 such as a police detective inputting one of his cover names as included in a first identifier and/or a telephone number included in a second identifier to call a second entity 104 an informant). The presentation device may entail an audio feature, e.g., a ringer and/or a speaker, and/or a tactile feature, e.g., a vibration device, and/or a video feature, e.g., a computer display screen and/or a telephone caller identification feature of a system 106 associated with the first entity 102, such as a VoIP endpoint and/or a telephone. The purpose of the transmission may include, e.g., enabling presentation of a communication scenario identifier and/or a first identifier and/or a second identifier as a verification of the displayed communication scenario identifier and/or as an aid to memory.

The transmitting of operation 802 may be performed, for example, using the memory resources and/or hardware/software/firmware of the communication mediating system 112 and/or memory resources and/or hardware/software/firmware operably coupled to the communication mediating system 112, and/or using the memory resources and/or hardware/software/firmware of a system 106 associated with the first entity 102 and/or hardware/software/firmware operably coupled to the system 106 associated with the first entity 102.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (Asics), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
    receiving a request at a first time for a first identifier associated with a first entity in conjunction with a communication scenario;
    receiving a request for a second identifier associated with a second entity in conjunction with the communication scenario;
    generating the first identifier responsive to the received request for the first identifier, the first identifier including at least a proxy for a primary identifier associated with the first entity in conjunction with the communication scenario, the first identifier including at least the proxy configured to be perceivable by the second entity to be the primary identifier associated with the first entity;
    establishing the second identifier responsive to the received request for the second identifier associated with the second entity in conjunction with the communication scenario, the second identifier including at least one indication of relative priority of communications between the first entity and the second entity, the relative priority at least partially based on the first time;
    detecting a communication from the second entity at a second time, the detected communication directed to the proxy for the primary identifier associated with the first entity in conjunction with the communication scenario; and
    transmitting, responsive to the detected communication, a signal receivable by a communication system associated with the first entity at least partially based on the primary identifier, the signal operable to enable a presentation of at least a portion of the second identifier associated with the second entity in conjunction with the communication scenario using at least one presentation feature of the communication system associated with the first entity in association with the detected communication, the at least one presentation feature at least partially based on (i) the at least one indication of relative priority associated with the second identifier and (ii) the second time,
    wherein at least one of the receiving, generating, establishing, detecting, or transmitting is at least partially implemented using one or more processing devices.

2. The method of claim 1, wherein generating the first identifier responsive to the received request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprises:
    generating the first identifier associated with the first entity in conjunction with the communication scenario, wherein the first identifier includes at least a telephone number and wherein the communication scenario includes at least an interaction between the first entity and the second entity.

3. The method of claim 1, wherein generating the first identifier responsive to the received request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprises:
    generating the first identifier associated with the first entity in conjunction with the communication scenario, wherein the first identifier includes at least a proxy Internet Protocol address and wherein the communication scenario includes at least an interaction between the first entity and the second entity.

4. The method of claim 1, wherein generating the first identifier responsive to the received request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprises:
    generating the first identifier associated with the first entity in conjunction with the communication scenario at least in part randomly, wherein the communication scenario includes at least an interaction between the first entity and the second entity.

5. The method of claim 1, wherein generating the first identifier responsive to the received request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprises:
    generating the first identifier associated with the first entity in conjunction with the communication scenario at least in part pseudo-randomly, wherein the communication scenario includes at least an interaction between the first entity and the second entity.

6. The method of claim 1, wherein generating the first identifier responsive to the received request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprises:
generating the first identifier associated with the first entity in conjunction with the communication scenario at least in part using a selection from a database, wherein the communication scenario includes at least an interaction between the first entity and the second entity.

7. The method of claim 1, wherein generating the first identifier responsive to the received request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprises:
generating the first identifier associated with the first entity in conjunction with the communication scenario using at least one of a random generation process or a pseudo-random generation process to make a selection from a database, wherein the communication scenario includes at least an interaction between the first entity and the second entity.

8. The method of claim 1, wherein establishing the second identifier responsive to the received request for the second identifier associated with the second entity in conjunction with the communication scenario, the second identifier including at least one indication of relative priority of communications between the first entity and the second entity, the relative priority at least partially based on the first time, comprises:
establishing the second identifier associated with the second entity in conjunction with the communication scenario, wherein the second identifier includes at least a telephone number and wherein the communication scenario includes at least an interaction between the first entity and the second entity.

9. The method of claim 1, wherein establishing the second identifier responsive to the received request for the second identifier associated with the second entity in conjunction with the communication scenario, the second identifier including at least one indication of relative priority of communications between the first entity and the second entity, the relative priority at least partially based on the first time, comprises:
establishing the second identifier associated with the second entity in conjunction with the communication scenario, wherein the second identifier includes at least an Internet Protocol address and wherein the communication scenario includes at least an interaction between the first entity and the second entity.

10. The method of claim 1, wherein establishing the second identifier responsive to the received request for the second identifier associated with the second entity in conjunction with the communication scenario, the second identifier including at least one indication of relative priority of communications between the first entity and the second entity, the relative priority at least partially based on the first time, comprises:
establishing the second identifier associated with the second entity in conjunction with the communication scenario, wherein the second identifier includes at least a name and wherein the communication scenario includes at least an interaction between the first entity and the second entity.

11. The method of claim 1, wherein establishing the second identifier responsive to the received request for the second identifier associated with the second entity in conjunction with the communication scenario, the second identifier including at least one indication of relative priority of communications between the first entity and the second entity, the relative priority at least partially based on the first time, comprises:
establishing the second identifier associated with the second entity in conjunction with the communication scenario at least in part randomly, wherein the communication scenario includes at least an interaction between the first entity and the second entity.

12. The method of claim 1, wherein establishing the second identifier responsive to the received request for the second identifier associated with the second entity in conjunction with the communication scenario, the second identifier including at least one indication of relative priority of communications between the first entity and the second entity, the relative priority at least partially based on the first time, comprises:
establishing the second identifier associated with the second entity in conjunction with the communication scenario at least in part pseudo-randomly, wherein the communication scenario includes at least an interaction between the first entity and the second entity.

13. The method of claim 1, wherein establishing the second identifier responsive to the received request for the second identifier associated with the second entity in conjunction with the communication scenario, the second identifier including at least one indication of relative priority of communications between the first entity and the second entity, the relative priority at least partially based on the first time, comprises:
establishing the second identifier associated with the second entity in conjunction with the communication scenario at least in part using a selection from a database, wherein the communication scenario includes at least an interaction between the first entity and the second entity.

14. The method of claim 1, wherein establishing the second identifier responsive to the received request for the second identifier associated with the second entity in conjunction with the communication scenario, the second identifier including at least one indication of relative priority of communications between the first entity and the second entity, the relative priority at least partially based on the first time, comprises:
establishing the second identifier associated with the second entity in conjunction with the communication scenario using at least one of a random generation process or a pseudorandom generation process to make a selection from a database, wherein the communication scenario includes at least an interaction between the first entity and the second entity.

15. The method of claim 1, wherein transmitting, responsive to the detected communication a signal receivable by a communication system associated with the first entity at least partially based on the primary identifier, the signal operable to enable a presentation of at least a portion of the second identifier associated with the second entity in conjunction with the communication scenario using at least one presentation feature of the communication system associated with the first entity in association with the detected communication, the at least one presentation feature at least partially based on (i) the at least one indication of relative priority associated with the second identifier and (ii) the second time comprises:

transmitting the signal to enable the presentation from a communication mediating system operably coupled with the communication system.

16. The method of claim 15, wherein transmitting the signal to enable the presentation from a communication mediating system operably coupled with the communication system comprises:

transmitting the signal to enable the presentation from a system associated with a wireless telephony provider to a cell phone associated with a subscriber to the wireless telephony provider, the subscriber associated with at least the first entity.

17. The method of claim 1, wherein transmitting, responsive to the detected communication, a signal receivable by a communication system associated with the first entity at least partially based on the primary identifier, the signal operable to enable a presentation of at least a portion of the second identifier associated with the second entity in conjunction with the communication scenario using at least one presentation feature of the communication system associated with the first entity in association with the detected communication, the at least one presentation feature at least partially based on (i) the at least one indication of relative priority associated with the second identifier and (ii) the second time comprises:

providing, by a cell phone, the signal to enable the presentation of the at least a portion of the second identifier.

18. The method of claim 1, wherein receiving a request at a first time for a first identifier associated with a first entity and a second identifier associated with a second entity in conjunction with a communication scenario comprises:

receiving a request from a cell phone operably coupled with a wireless telephony provider for a proxy telephone number associated with the actual telephone number assigned to a subscriber to the wireless telephony provider, the subscriber associated with at least the first entity.

19. The method of claim 18, wherein receiving a request from a cell phone operably coupled with a wireless telephony provider for a proxy telephone number associated with the actual telephone number assigned to a subscriber to the wireless telephony provider, the subscriber associated with at least the first entity comprises:

receiving a request from a cell phone at least partially via a communication mediation system operably coupled with the wireless telephony provider.

20. The method of claim 18, wherein receiving a request from a cell phone operably coupled with a wireless telephony provider for a proxy telephone number associated with the actual telephone number assigned to a subscriber to the wireless telephony provider, the subscriber associated with at least the first entity comprises:

receiving a request at a cell phone, the request associated with at least some data entry via at least one user interface of the cell phone.

21. A machine comprising:

circuitry for receiving a request at a first time for a first identifier associated with a first entity in conjunction with a communication scenario;

circuitry for receiving a second identifier associated with a second entity in conjunction with the communication scenario;

circuitry for generating the first identifier responsive to the circuitry for receiving a request for the first identifier, the first identifier including at least a proxy for a primary identifier associated with the first entity in conjunction with the communication scenario, the first identifier including at least the proxy configured to be perceivable by the second entity to be the primary identifier associated with the first entity;

circuitry for establishing the second identifier responsive to the circuitry for receiving a request for the second identifier associated with the second entity in conjunction with the communication scenario, the second identifier including at least one indication of relative priority of communications between the first entity and the second entity, the relative priority at least partially based on the first time;

circuitry for detecting a communication from the second entity at a second time, the communication directed to the proxy for the primary identifier associated with the first entity in conjunction with the communication scenario; and circuitry for transmitting, responsive to the circuitry for detecting a communication, a signal receivable by a communication system associated with the first entity at least partially based on the primary identifier, the signal operable to enable a presentation of at least a portion of the second identifier associated with the second entity in conjunction with the communication scenario using at least one presentation feature of the communication system associated with the first entity in association with the detected communication, the at least one presentation feature at least partially based on (i) the at least one indication of relative priority associated with the second identifier and (ii) the second time.

22. The machine of claim 21, wherein the circuitry for generating the first identifier responsive to the circuitry for receiving a request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprises:

circuitry for generating the first identifier associated with the first entity in conjunction with the communication scenario, wherein the circuitry for the first identifier includes at least a telephone number and wherein the communication scenario includes at least an interaction between the first entity and the second entity.

23. The machine of claim 21, wherein the circuitry for generating the first identifier responsive to the circuitry for receiving a request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprises:

circuitry for generating the first identifier associated with the first entity in conjunction with the communication scenario, wherein the circuitry for the first identifier includes at least an Internet Protocol address and wherein the communication scenario includes at least an interaction between the first entity and the second entity.

24. The machine of claim 21, wherein the circuitry for generating the first identifier responsive to the circuitry for receiving a request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprises:

circuitry for generating the first identifier associated with the first entity in conjunction with the communication scenario at least in part randomly, wherein the circuitry for the communication scenario includes at least an interaction between the first entity and the second entity.

25. The machine of claim 21, wherein the circuitry for generating the first identifier responsive to the circuitry for receiving a request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprises:

circuitry for generating the first identifier associated with the first entity in conjunction with the communication scenario at least in part pseudo-randomly, wherein the circuitry for the communication scenario includes at least an interaction between the first entity and the second entity.

26. The machine of claim 21, wherein the circuitry for generating the first identifier responsive to the circuitry for receiving a request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprises:

circuitry for generating the first identifier associated with the first entity in conjunction with the communication scenario at least in part using a selection from a database, wherein the circuitry for the communication scenario includes at least an interaction between the first entity and the second entity.

27. The machine of claim 21, wherein the circuitry for generating the first identifier responsive to the circuitry for receiving a request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprises:

circuitry for generating the first identifier associated with the first entity in conjunction with the communication scenario using at least one of a random generation process or a pseudo-random generation process to make a selection from a database, wherein the circuitry for the communication scenario includes at least an interaction between the first entity and the second entity.

28. The machine of claim 21, wherein the circuitry for transmitting, responsive to the circuitry for detecting a communication, a signal receivable by a communication system associated with the first entity at least partially based on the primary identifier, the signal operable to enable a presentation of at least a portion of the second identifier associated with the second entity in conjunction with the communication scenario using at least one presentation feature of the communication system associated with the first entity in association with the detected communication, the at least one presentation feature at least partially based on (i) the at least one indication of relative priority associated with the second identifier and (ii) the second time comprises:

circuitry for transmitting the signal to enable the presentation from a communication mediating system operably coupled with the communication system.

29. The machine of claim 28, wherein the circuitry for transmitting the signal to enable the presentation from a communication mediating system operably coupled with the communication system comprises:

circuitry for transmitting the signal to enable the presentation from a system associated with a wireless telephony provider to a cell phone associated with a subscriber to the wireless telephony provider, the subscriber associated with at least the first entity.

30. The machine of claim 21, wherein the circuitry for transmitting, circuitry for detecting a communication, a signal receivable by a communication system associated with the first entity at least partially based on the primary identifier, the signal operable to enable a presentation of at least a portion of the second identifier associated with the second entity in conjunction with the communication scenario using at least one presentation feature of the communication system associated with the first entity in association with the detected communication, the at least one presentation feature at least partially based on (i) the at least one indication of relative priority associated with the second identifier and (ii) the second time comprises:

circuitry for providing, by a cell phone, the signal to enable the presentation of the at least a portion of the second identifier.

31. The machine of claim 21, wherein the circuitry for receiving a request at a first time for a first identifier associated with a first entity and a second identifier associated with a second entity in conjunction with a communication scenario comprises:

circuitry for receiving a request from a cell phone operably coupled with a wireless telephony provider for a proxy telephone number associated with the actual telephone number assigned to a subscriber to the wireless telephony provider, the subscriber associated with at least the first entity.

32. The machine of claim 31, wherein the circuitry for receiving a request from a cell phone operably coupled with a wireless telephony provider for a proxy telephone number associated with the actual telephone number assigned to a subscriber to the wireless telephony provider, the subscriber associated with at least the first entity comprises:

circuitry for receiving a request from a cell phone at least partially via a communication mediation system operably coupled with the wireless telephony provider.

33. The machine of claim 31, wherein the circuitry for receiving a request from a cell phone operably coupled with a wireless telephony provider for a proxy telephone number associated with the actual telephone number assigned to a subscriber to the wireless telephony provider, the subscriber associated with at least the first entity comprises:

circuitry for receiving a request at a cell phone, the request associated with at least some data entry via at least one user interface of the cell phone.

34. A computer program product, comprising:
at least non-transitory computer-readable medium including at least:
one or more instructions for receiving a request at a first time for a first identifier associated with a first entity in conjunction with a communication scenario;
one or more instructions for receiving a second identifier associated with a second entity in conjunction with the communication scenario;
one or more instructions for generating the first identifier responsive to at least one of the one or more instructions for receiving a request for the first identifier, the first identifier including at least a proxy for a primary identifier associated with the first entity in conjunction with the communication scenario, the first identifier including at least the proxy configured to be perceivable by the second entity to be the primary identifier associated with the first entity;

one or more instructions for establishing the second identifier responsive to at least one of the one or more instructions for receiving a request for the second identifier associated with the second entity in conjunction with the communication scenario, the second identifier including at least one indication of relative priority of communications between the first entity and the second entity, the relative priority at least partially based on the first time;

one or more instructions for detecting a communication from the second entity at a second time, the communication directed to the proxy for the primary identifier associated with the first entity in conjunction with the communication scenario; and one or more instructions for transmitting, responsive to the at least one of the one of more instruction for detecting a communication, a signal receivable by a communication system associated with the first entity at least partially based on the primary identifier, the signal operable to enable a presentation of at least a portion of the second identifier associated with the second entity in conjunction with the communication scenario using at least one presentation feature of the communication system associated with the first entity in association with the detected communication, the at least one presentation feature at least partially based on (i) the at least one indication of relative priority associated with the second identifier and (ii) the second time.

35. The computer program product of claim 34, wherein at least some of the one or more instructions for generating the first identifier responsive to the received request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprise:

one or more instructions for generating the first identifier associated with the first entity in conjunction with the communication scenario, wherein the first identifier includes at least a telephone number and wherein the communication scenario includes at least an interaction between the first entity and the second entity.

36. The computer program product of claim 34, wherein at least some of the one or more instructions for generating the first identifier responsive to the received request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprise:

one or more instructions for generating the first identifier associated with the first entity in conjunction with the communication scenario, wherein the first identifier includes at least an Internet Protocol address and wherein the communication scenario includes at least an interaction between the first entity and the second entity.

37. The computer program product of claim 34, wherein at least some of the one or more instructions for generating the first identifier responsive to the received request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprise:

one or more instructions for generating the first identifier associated with the first entity in conjunction with the communication scenario at least in part randomly, wherein the communication scenario includes at least an interaction between the first entity and the second entity.

38. The computer program product of claim 34, wherein at least some of the one or more instructions for generating the first identifier responsive to the received request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprise:

one or more instructions for generating the first identifier associated with the first entity in conjunction with the communication scenario at least in part pseudo-randomly, wherein the communication scenario includes at least an interaction between the first entity and the second entity.

39. The computer program product of claim 34, wherein at least some of the one or more instructions for generating for the first identifier responsive to the received request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprise:

one or more instructions for generating the first identifier associated with the first entity in conjunction with the communication scenario at least in part using a selection from a database, wherein the communication scenario includes at least an interaction between the first entity and the second entity.

40. The computer program product of claim 34, wherein at least some of the one or more instructions for generating for the first identifier responsive to the received request for the first identifier, the first identifier including at least a proxy for a primary identifier associated with the first entity in conjunction with the communication scenario, the first identifier including at least the proxy configured to be perceivable by the second entity to be the primary identifier associated with the first entity, comprise:

one or more instructions for generating the first identifier associated with the first entity in conjunction with the communication scenario using at least one of a random generation process or a pseudo-random generation process to make a selection from a database, wherein the communication scenario includes at least an interaction between the first entity and the second entity.

41. The computer program product of claim 34, wherein at least some of the one or more instructions for establishing the second identifier responsive to at least one of the one or more instructions for receiving a request for the second identifier associated with the second entity in conjunction with the communication scenario, the second identifier including at least one indication of relative priority of communications between the first entity and the second entity, the relative priority at least partially based on the first time, comprise:

one or more instructions for establishing the second identifier associated with the second entity in conjunction with the communication scenario, wherein the second identifier includes at least a telephone number and wherein the communication scenario includes at least an interaction between the first entity and the second entity.

42. The computer program product of claim 34, wherein at least some of the one or more instructions for establishing the second identifier responsive to at least one of the one or more instructions for receiving a request for the second identifier associated with the second entity in conjunction with the communication scenario, the second identifier including at least one indication of relative priority of communications between the first entity and the second entity, the relative priority at least partially based on the first time, comprise:
one or more instructions for establishing the second identifier associated with the second entity in conjunction with the communication scenario, wherein the second identifier includes at least an Internet Protocol address and wherein the communication scenario includes at least an interaction between the first entity and the second entity.

43. The computer program product of claim 34, wherein at least some of the one or more instructions for establishing the second identifier responsive to at least one of the one or more instructions for receiving a request for the second identifier associated with the second entity in conjunction with the communication scenario, the second identifier including at least one indication of relative priority of communications between the first entity and the second entity, the relative priority at least partially based on the first time, comprise:
one or more instructions for establishing the second identifier associated with the second entity in conjunction with the communication scenario, wherein the second identifier includes at least a name and wherein the communication scenario includes at least an interaction between the first entity and the second entity.

44. The computer program product of claim 34, wherein at least some of the one or more instructions for establishing the second identifier responsive to at least one of the one or more instructions for receiving a request for the second identifier associated with the second entity in conjunction with the communication scenario, the second identifier including at least one indication of relative priority of communications between the first entity and the second entity, the relative priority at least partially based on the first time, comprise:
one or more instructions for establishing the second identifier associated with the second entity in conjunction with the communication scenario at least in part randomly, wherein the communication scenario includes at least an interaction between the first entity and the second entity.

45. The computer program product of claim 34, wherein at least some of the one or more instructions for establishing the second identifier responsive to at least one of the one or more instructions for receiving a request for the second identifier associated with the second entity in conjunction with the communication scenario, the second identifier including at least one indication of relative priority of communications between the first entity and the second entity, the relative priority at least partially based on the first time, comprise:
one or more instructions for establishing the second identifier associated with the second entity in conjunction with the communication scenario at least in part pseudorandomly, wherein the communication scenario includes at least an interaction between the first entity and the second entity.

46. The computer program product of claim 34, wherein at least some of the one or more instructions for establishing the second identifier responsive to at least one of the one or more instructions for receiving a request for the second identifier associated with the second entity in conjunction with the communication scenario, the second identifier including at least one indication of relative priority of communications between the first entity and the second entity, the relative priority at least partially based on the first time, comprise:
one or more instructions for establishing the second identifier associated with the second entity in conjunction with the communication scenario at least in part using a selection from a database, wherein the communication scenario includes at least an interaction between the first entity and the second entity.

47. The computer program product of claim 34, wherein at least some of the one or more instructions for establishing the second identifier responsive to at least one of the one or more instructions for receiving a request for the second identifier associated with the second entity in conjunction with the communication scenario, the second identifier including at least one indication of relative priority of communications between the first entity and the second entity, the relative priority at least partially based on the first time, comprise:
one or more instructions for establishing the second identifier associated with the second entity in conjunction with the communication scenario using at least one of a random generation process or a pseudo-random generation process to make a selection from a database, wherein the communication scenario includes at least an interaction between the first entity and the second entity.

48. The computer program product of claim 34, wherein at least some of the one of more instructions for transmitting responsive to the detected communication a signal receivable by a communication system associated with the first entity at least partially based on the primary identifier, the signal operable to enable a presentation of at least a portion of the second identifier associated with the second entity in conjunction with the communication scenario using at least one presentation feature of the communication system associated with the first entity in association with the detected communication, the at least one presentation feature at least partially based on (i) the at least one indication of relative priority associated with the second identifier and (ii) the second time comprise:
one or more instructions for transmitting the signal to enable the presentation from a communication mediating system operably coupled with the communication system.

49. The computer program product of claim 48, wherein at least some of the one or more instructions for transmitting the signal to enable the presentation from a communication mediating system operably coupled with the communication system comprise:
one or more instructions for transmitting the signal to enable the presentation from a system associated with a wireless telephony provider to a cell phone associated with a subscriber to the wireless telephony provider, the subscriber associated with at least the first entity.

50. The computer program product of claim 34, wherein at least some of the one or more instructions for transmitting responsive to the detected communication, a signal receivable by a communication system associated with the first entity at least partially based on the primary identifier, the signal operable to enable a presentation of at least a portion of the second identifier associated with the second entity in conjunction with the communication scenario using at least one presentation feature of the communication system associated with the first entity in association with the detected communication, the at least one presentation feature at least partially based on (i) the at least one indication of relative priority associated with the second identifier and (ii) the second time comprise:

one or more instructions for providing, by a cell phone, the signal to enable the presentation of the at least a portion of the second identifier.

51. The computer program product of claim 34, wherein at least some of the one or more instructions for receiving a request at a first time for a first identifier associated with a first entity and a second identifier associated with a second entity in conjunction with a communication scenario comprise:

one or more instructions for receiving a request from a cell phone operably coupled with a wireless telephony provider for a proxy telephone number associated with the actual telephone number assigned to a subscriber to the wireless telephony provider, the subscriber associated with at least the first entity.

52. The computer program product of claim 51, wherein at least some of the one or more instructions for receiving a request from a cell phone operably coupled with a wireless telephony provider for a proxy telephone number associated with the actual telephone number assigned to a subscriber to the wireless telephony provider, the subscriber associated with at least the first entity comprise:

one or more instructions for receiving a request from a cell phone at least partially via a communication mediation system operably coupled with the wireless telephony provider.

53. The computer program product of claim 51, wherein at least some of the one or more instructions for receiving a request from a cell phone operably coupled with a wireless telephony provider for a proxy telephone number associated with the actual telephone number assigned to a subscriber to the wireless telephony provider the subscriber associated with at least the first entity comprise:

one or more instructions for receiving a request at a cell phone, the request associated with at least some data entry via at least one user interface of the cell phone.

54. A machine comprising:

means for generating a first identifier associated with a first entity in conjunction with a communication scenario; and means for establishing a second identifier associated with a second entity in conjunction with the communication scenario, wherein at least one of the means for generating or means for establishing is at least partially implemented in one or more processing devices.

* * * * *